United States Patent
Ichikawa

(10) Patent No.: US 6,417,642 B2
(45) Date of Patent: Jul. 9, 2002

(54) MOTOR-CONTROLLING CIRCUIT FOR AN OPTICAL-AXIS-ADJUSTING UNIT OF A VEHICLE ILLUMINATING DEVICE

(75) Inventor: Tomoyuki Ichikawa, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 09/851,114

(22) Filed: May 9, 2001

(30) Foreign Application Priority Data

May 12, 2000 (JP) ........................................ 2000-140262

(51) Int. Cl.[7] .............................................. G05B 1/06
(52) U.S. Cl. .................... 318/638; 318/648; 340/466; 362/460; 315/99
(58) Field of Search .................. 340/466, 467; 362/460, 464–466; 315/79, 82; 318/648, 638, 609, 610, 599, 811

(56) References Cited

U.S. PATENT DOCUMENTS

| | | | | |
|---|---|---|---|---|
| 4,908,560 A | * | 3/1990 | Shibata et al. | |
| 5,217,087 A | * | 6/1993 | Ikegami et al. | |
| 5,410,234 A | * | 4/1995 | Shibata et al. | ........ 318/609 X |
| 5,479,323 A | * | 12/1995 | Shibata et al. | |
| 5,876,113 A | * | 3/1999 | Gotoh | |
| 5,877,680 A | * | 3/1999 | Okuchi et al. | |
| 5,907,196 A |   | 5/1999 | Hayami et al. | ............ 307/10.8 |

* cited by examiner

Primary Examiner—Jeffrey Donels
(74) Attorney, Agent, or Firm—Sughrue Mion, PLLC

(57) ABSTRACT

A motor-controlling circuit for an optical-axis-adjusting unit of an illuminating device. The motor-controlling circuit ensures smooth control of a motor, which adjusts an optical axis, and ensures accurate repetition of a motor-stop position by way of PID and PWM control. The motor-controlling circuit 9 includes a motor 7 and a position detecting portion 6b. Feedback control is performed whereby an error between the motor's present position information, and the target value of position control, becomes zero. The motor-controlling circuit also includes a calculation portion 14 including a proportional-calculation portion 11, an integration-calculation portion 12, a differential-calculation portion 13, and a PID-calculation-processing portion 15 that calculates control by adding weighted respective outputs of the calculation portion 14. Further, a PWM-controlling-portion 16 generates a control signal having a duty cycle that is varied in response to the amount of control from the PID-calculation-processing portion 15, whereby the drive and control of the motor 7 are executed.

7 Claims, 22 Drawing Sheets

MOTOR-CONTROLLING CIRCUIT FOR AN OPTICAL-AXIS-ADJUSTING UNIT OF A VEHICLE ILLUMINATING DEVICE

BACKGROUND OF THE INVENTION

1. Field of the Invention

The present invention relates to a motor-controlling circuit used for an optical-axis-adjusting unit of a vehicle illuminating device.

2. Description of the Related Art

A unit for controlling the irradiating direction, which adjusts the optical axis of a vehicle illuminating device in compliance with a change in the posture of the vehicle, has been known as a so-called leveling unit. For example, there is a unit by which the optical axis is manually adjusted by an operation switch in response to the riding conditions of passengers and/or cargo-loading conditions in a vehicle. Also, there is a unit by which the lighting or irradiating direction is automatically corrected so that the irradiating direction of an illuminating device can be kept constant in response to changes in the running conditions of a vehicle (a so-called auto-leveling unit).

As a mechanism for adjusting the optical axis (or correcting the optical axis), there has been known a mechanism in which the position and posture of the illuminating device or optical system components are changed by a direct current motor and its drive controlling circuit. For example, there is employed a construction in which an analog drive method applies an appointed direct current voltage to a motor, and, at the same time, the difference between the target position and the present position is controlled to become zero by a sensor for detecting the motor position.

However, in the related art motor-controlling circuit, there are some problems. One problem is a difficulty in guaranteeing smooth rotation control of the motor and accurate reappearance of the stopping position thereof at high precision. Another problem is an increase in costs of semiconductor elements because the loss of the corresponding semiconductor elements is increased when applying power voltage to the motor using semiconductor switching elements such as transistors, and some heat radiation devices are required. Therefore, heretofore it has been very difficult to achieve accurate and stable operations with respect to all the running environments of a vehicle, and difficult to suppress an increase in costs.

SUMMARY OF THE INVENTION

The present invention relates to a motor-controlling circuit, for the optical-axis-adjusting unit of a vehicle illuminating device, which motor-controlling circuit guarantees smooth rotation control of a motor that is used as a drive source for adjusting the optical axis, and guarantees accurate repetition of the motor-stopping position, but does not require a remarkable increase in cost.

In order to achieve the above problems, the invention is featured in that a motor-controlling circuit, for an optical-axis-adjusting unit of a vehicle illuminating device, having a direct current motor as a drive source for adjusting the optical axis and a position detecting portion thereof, which carries out feedback control so that an error value between the present position information of the motor, which is obtained by the position detecting portion, and a target value of position control becomes zero, comprises:

a proportional calculation portion for calculating said error;

an integration calculation portion for integrating the errors calculated by said proportional calculation portion;

a differential calculation portion for calculating a first-order derivative per time with respect to the position information from said position detecting portion;

a PID calculation processing portion for calculating an amount of control by adding respective outputs of said proportional calculation portion, the integration calculation portion, and the differential calculation portion, after the respective outputs have been multiplied by respective weighting coefficients; and a pulse width modulating (PWM) control portion for generating a control signal having a duty cycle that is varied in response to the amount of control from said PID calculation processing portion, and for carrying out drive control of the direct current motor on the basis of said control signal.

Therefore, according to the present invention, since motor control is carried out on the basis of a pulse width modulation signal responsive to the amount of control by the PID calculation processing portion, it is possible to guarantee both smooth rotation control of a motor—which is a drive source for adjusting the optical axis—and accurate repetition of the motor-stopping position, whereby it is possible to achieve a decrease in the switching loss and to prevent the cost thereof from increasing.

BRIEF DESCRIPTION OF THE DRAWINGS

The above and other objects and advantages of the present invention will become more apparent by describing in detail preferred exemplary embodiments thereof with reference to the accompanying drawings, wherein like reference numerals designate like or corresponding parts throughout the several views, and wherein:

FIG. 4 is a view describing, along with FIG. 5, an algorithm pertaining to a square calculation, wherein FIG. 4 shows the front half of the sequence;

FIG. 9 is a view describing, along with FIG. 10, a PWM calculation portion, wherein FIG. 9 shows a configurational example;

FIG. 12 is a view showing, along with FIG. 13, a configurational example of a differential calculation process portion, wherein FIG. 12 shows the construction of the front half of the differential calculation process portion;

FIG. 14 is a view showing, along with FIG. 15, a configurational example of a square calculation circuit, wherein FIG. 14 shows a construction pertaining to signal generation necessary for the calculation process.

FIG. 22 is a flow chart showing, along with FIG. 23 and FIG. 24, a sequential example of motor drive control, wherein FIG. 22 shows the beginning portion of the process;

PREFERRED EMBODIMENTS OF THE INVENTION

Figure 1:
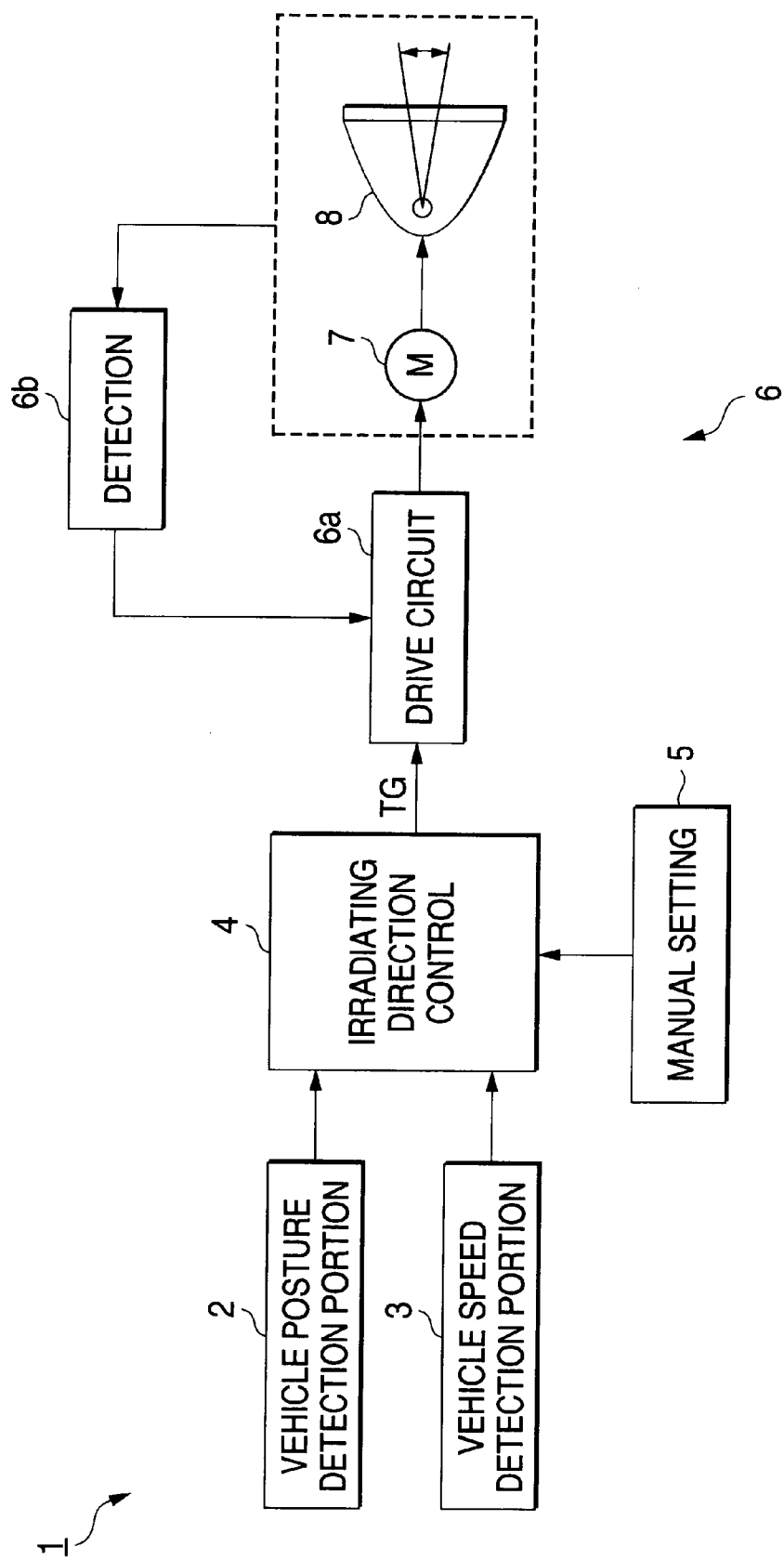
FIG. 1 is a block diagram showing the basic configuration of an optical-axis-adjusting unit of a vehicle illuminating device.

FIG. 1 shows the basic configuration of an optical-axis-adjusting (or correcting) unit according to the invention. The illustrated configuration is shown, for convenience of description, as a unit including both automatic control and manual control of the irradiating direction.

The optical-axis-adjusting unit 1 of a vehicle illuminating device includes a vehicle posture detecting portion 2, a vehicle velocity detecting portion 3, an irradiating direction controlling portion 4, a manual setting portion 5 and a motor controlling portion 6.

The motor controlling portion 6 is devised so as to send a control signal to a direct current motor 7 upon receiving a control target value signal (called "TG") that is transmitted from the irradiating direction controlling portion 4 to a drive circuit 6a, and upon receiving the optical axis direction of illuminating device 8 (vehicle head lamps, for example) in response to the rotating angle of the motor. Further, the motor controlling unit 6 is provided with a detecting portion 6b that detects a rotating angle of the motor 7 and, accordingly, the optical axis direction of illuminating device 8 corresponding thereto, wherein a detection signal—corresponding to the present value—is detected by the corresponding detecting portion 6b, is sent to the drive circuit 6a, and is compared with the control target value signal TG.

The vehicle posture detection portion 2 is required to change the irradiating direction of an illuminating device 8 in response to a change in posture of the front and rear direction of the vehicle by obtaining the pitch angle of the vehicle. The detection signal is sent to the irradiating direction controlling portion 4. The vehicle posture detecting portion 2 is provided with, for example, a vehicle height detecting device that detects changes in height with respect to the axle portions at the front wheels, or rear wheels, or both the front and rear wheels, and that acquires basic information in order to obtain the stopping posture and running posture of the vehicle on the basis of changes in the vehicle height. For example, there are two methods for detecting the vehicle height. First, there is a method for measuring the distance between the vehicle height detecting device and the surface of a road by using a detection wave which is an ultrasonic wave or laser light. Second, there is a method for detecting the amount of elongation and contraction of the suspensions by employing a vehicle height sensor as the vehicle height detecting device that detects vertical fluctuations at the axle portions of the front wheels or rear wheels, etc.

The vehicle velocity detecting portion 3 is provided to detect the velocity of the vehicle as primary information, and to calculate the acceleration and information pertaining to the acceleration by calculating the amount of fluctuations in velocity per time unit. Further, an output signal of the vehicle velocity detecting portion 3 is sent to the irradiating direction controlling portion 4.

The manual setting portion 5 is required to change the optical axis direction of illuminating device 8 by a manual operation using an operation switch. An instruction signal is sent from the manual setting portion to the irradiating direction controlling portion 4.

Upon receiving detection signals from the vehicle posture detecting portion 2 and from the vehicle velocity detecting portion 3, the irradiating direction controlling portion 4 generates a control target value signal TG in response to a change in the pitch angle of the vehicle and outputs the same signal to the motor controlling portion 6, whereby the irradiating direction of the illuminating device can be corrected. Alternatively, the irradiating direction controlling portion 4 generates a control target signal TG in response to an instruction signal from the manual setting portion 5 and outputs the same signal to the motor controlling portion 6.

In addition, with respect to the detection of a change in the pitch angle, various types of methods have been proposed to detect such a change, and the method does not matter as far as the present invention is concerned. Therefore, a description thereof is omitted.

Further, the irradiating direction of illuminating device 8 is controlled by rotation control of the motor 7 in response to the control target value signal TG that is sent from the irradiating direction controlling portion 4 to the drive circuit 6a. There are two types of methods for adjusting the direction of the illuminating device 8. A first method includes orienting the entire beam to an appointed direction, whereas the other method includes orienting a part of the beam to an appointed direction. For example, the first method may include changing the direction of an irradiation axis of the illuminating device by turning the entire illuminating device around its axis of rotation, or may include changing the optical axis direction of the optical system by controlling the posture of components, of the illuminating device, such as a reflection mirror, lens, light source, light-shielding member, etc. In addition, the second method may include changing the lighting axis of a specified illuminating device in a unit having a plurality of illuminating devices in order to partially change the irradiating direction. For example, in the case where a vehicle is provided with a head lamp, a fog lamp, and a cornering lamp, only one or two of the three lamps would be changed. Also, the second method may include changing the posture of one, or a plurality, of the members that constitute the optical system of illuminating devices. For example, the reflection mirror may be composed of a fixed reflection mirror and a movable reflection mirror, wherein the optical axis of the movable reflection mirror can be changed so that it is oriented to an appointed direction.

Figure 2:
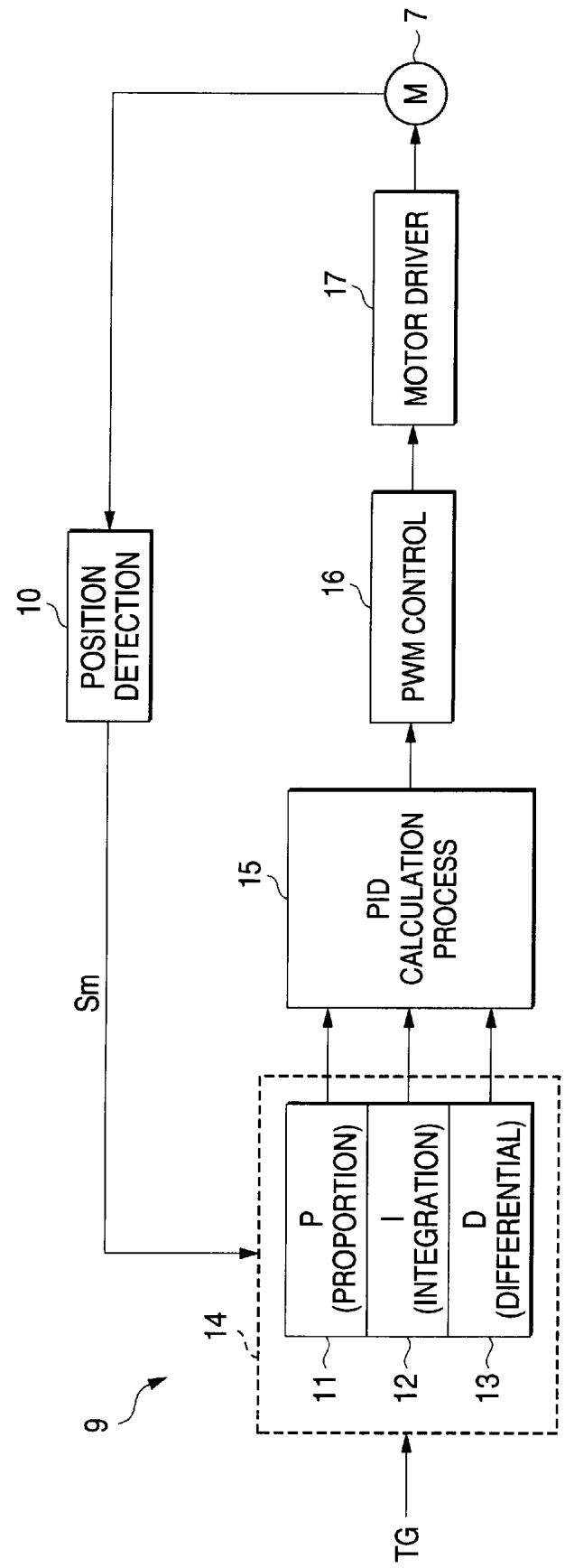
FIG. 2 is a block diagram showing the basic configuration of a motor-controlling circuit according to the invention.

FIG. 2 shows the basic configuration of a motor-controlling circuit 9 according to the present invention.

The circuit is composed of a digital calculation circuit, wherein feedback control is carried out so that the error value between the present position information of the motor—which is obtained from the position detecting portion 10 of the direct current motor 7—and the target value of position control becomes zero.

By employing [P]roportion, [I]ntegration, and [D]ifferentiation (PID) control, it is possible to achieve a smooth rotation of the motor and accurate stopping control at the target position. At the same time, the control efficiency can be improved by performing velocity control of the motor by a control signal (the duty cycle of which is variable) by using pulse width modulation (PWM) control.

Respective components are as follows (Figures in brackets indicate reference numbers in the accompanying drawings):

Calculation portion (14) is composed of a proportional calculation portion (11), an integration calculation portion (12), and a differential calculation portion (13)

PID calculation processing portion (15)

Pulse width modulation (PWM) controlling portion (16)

Information of the motor position is detected by the position-detecting portion 10, and the detection signal (referred to as [Sm]) is sent to the calculation portion 14.

The proportional calculation portion 11 calculates the error value between the target value shown by the signal TG and the present value shown the signal Sm. Within the proportional calculation portion 14, the differential calculation portion 13 calculates the first-order derivative (velocity) per time with respect to the signal position from the position detecting portion 10.

Additionally, the integration calculation portion 12 calculates and operates the error calculated by the proportional calculation portion 11. Further, the PID calculation processing portion 15 calculates the amount of control by adding respective outputs of said proportional calculation portion 11, integration calculation portion 12, and differential calculation portion 13, that have been multiplied by weighting coefficients.

The pulse width modulating portion 16 generates a control signal having a duty cycle that is varied in response to the amount of control from the PID calculation processing portion 15, and carries out drive control of the direct current motor 7 on the basis of the corresponding signal. The output signal (PWM wave) from the PWM portion 16 is used as an ON/OFF control signal for a switching element (not shown) that constitutes the motor driver 17 described later. Also the motor driver 17 has a half-bridge or a full-bridge type construction using a plurality of sets of semiconductor switching elements.

In the proportional calculation portion 11, it is preferable to set a dead band when the error is near zero rather than to use of the amount of control, which is purely proportional to the error between the target position of the position control and the present value thereof This preference arises because it is important that no braking is employed to suppress brush friction in the direct current motor 7 that is used in, for example, an auto-bearing device. That is, it is important to establish a dead band of a fixed width centered around the point where the error is zero, under conditions that no problem occurs in terms of the optical axis control, and simultaneously to regulate the amount of control to zero when it is compared and judged whether or not the value of error that is obtained by the proportional calculation portion 11 is in a dead band and it is judged that the value of error is in the dead band. If no dead band is established, there is a possibility that oscillation may occur, which may result in greater friction than the brake.

Next, a description is given of a processing method of differential calculations according to the invention.

In order to bring about accuracy in the differential calculations of figures regarding data scattered due to sampling and quantization, the first-order difference formula is insufficient. It is preferable to use a higher-order difference formula.

For example, in the case where the handling data are 8-bit binary, 256 stages of motor positions can be detected. However, when the motor rotates comparatively slowly, only the lower two bits or so may change if the position differential (derivative) is calculated by the first-order differential equation. Therefore, inconvenience occurs in that the required accuracy cannot be obtained. However, by only increasing the order level, the difference formula becomes complicated, and the circuit configuration becomes increasingly complicated, resulting in an increase in cost.

Therefore, in the present invention, an algorithm is employed in which differential data are calculated in real time by using three points of time in total, including two past points of time and the present point of time.

Figure 3:
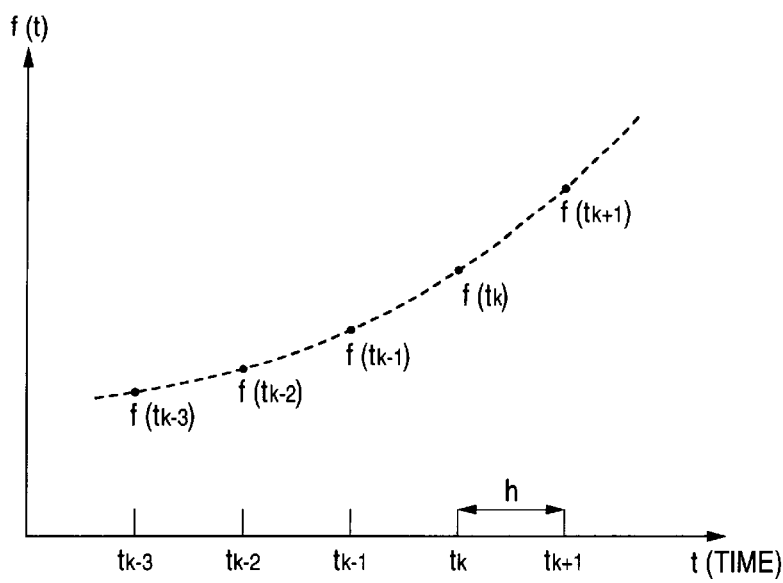
FIG. 3 is a graph describing a differential calculation process.

In FIG. 3, time t is expressed along the abscissa, the motor position (this is expressed in terms of a function [f(t)] of time t) is expressed along the ordinate, and data sampled once in each interval [h] of sampling are shown therein. Also, [f(t_k)] shows a figure sampled at time t=t_k. In the drawing, data sampled at respective times t=$t_{k-3}$, $t_{k-2}$, $t_{k-1}$ and $t_{k+1}$ are also shown in addition thereto (where k and i are a natural variable, [$t_{k-i}=t_k-i\cdot h$]).

First, infinite small interval h is made into a definite interval by the first-order derivative definition expression, wherein the following difference equation can be obtained.

$$f^{(1)}(t_k)=(f(t_k)-f(t_{k-1}))/h \qquad (1)$$

This is the first-order derivative equation that obtains differential data from the present point of time and the past point of time immediately therebefore. As described above, the accuracy is insufficient. Also, [$f^{(n)}(x)$] shows an n-order derivative of f(x) in terms of x.

The Taylor's theorem in the vicinity of [$t=t_k$] of f(t) is as follows:

$$f(t_k+h)=f(t_k)+h\cdot f^{(1)}(t_k)+(h^2/2!)\cdot f^{(2)}(t_k)+(h^3/3!)\cdot f^{(3)}(t_{k+} \qquad (2)$$

where [h^m] indicates m square of a variable b, and [M!] indicates a factorial of M. Here, h in Expression (2) above is replaced by [−h] (be careful about [$t_{k-1}=t_k-h$]), and the expression is cut off at the secondary term, wherein the following Expression (3) can be obtained.

$$f(t_{k-1})=f(t_k)-h\cdot f^{(1)}(t_k)+(h^2/2)\cdot f^{(2)}(t_k) \qquad (3)$$

Also, h in Expression (2) above is replaced by [−2·h] (be careful about [$t_{k-2}=t_{k-2}\cdot h$]), and the expression is cut off at the secondary term, wherein the following Expression (4) can be obtained.

$$f(t_{k-1})=f(t_k)-2\cdot h\cdot f^{(1)}(t_k)+(2\cdot h^2)\cdot f^{(2)}(t_k) \qquad (4)$$

Therefore, Expression (4) [(3)×4−(4)] is reformed in order to eliminate the secondary differential term from expressions (3) and (4), and $f^{(1)}(t_k)$ is solved, whereby the following Expression (5) can be obtained.

$$f^{(1)}(t_k)=(3\cdot f(t_k)-4\cdot f(t_{k-1})+f(t_{k-2}))/(2\cdot h) \qquad (5)$$

Using a difference expression in which h is made into a definite interval in Expression (5), the first-order derivative calculation (differential) can be carried out in real time. A more accurate calculation value can be obtained in comparison with the above-described Expression (1). And, based on the comparison between the numerators (those having a substantial meaning as a differential), Expression (5) brings about higher accuracy, by two times, than in Expression (1).

Further, in the above-described example, a formula for calculating the first-order derivative is arrived at from the values of detection at three points of time, which are the present point of time $f(t_k)$, the past figure $f(t_{k-1})$ one time unit (=h) before the present point, and the past figure $f(t_{k-2})$ two time units before the present point (=2·h). However, this is truly the case where [α=3/2] is placed in general expression $[\alpha \cdot (f(t_k)-f(t_{k-1}))/h+(i-\alpha)\cdot(f(t_{k-1})-f(t_{k-2}))/h]$ using a fixed coefficient α≠0. In addition, using the method similar to the above case, it is possible to arrive at a formula for calculating the first-order derivative (differential) from the figures of detection obtained from more than the three points of time. For example, in the case of four points of time, after expanding expressions until the third-order term is obtained with respect to $t_{k-1}, t_{k-2}$, and $t_{k-3}$, the third-order derivative terms are eliminated from the three expressions, and the second-order derivative term may be eliminated. However, since, in the case of increasing only the number of points of time, load may be increased in the calculation process, it is recommended that the calculation is carried out with as few points of time as possible in terms of the detection accuracy. In this sense, it can be said that the above-described expression (5) is optimal.

The method is the simplest, in which the per-time first-order derivative amount (velocity) thus obtained is sent to the PID calculation-processing portion 15, and is subtracted from the amount of control. A method for obtaining a square-law figure (amount proportional to motion energy [m·V^2/2], where m is mass and V is a velocity) and subtracting the same from the amount of control (that is, +V^2 is used for +V, and −V^2 is used for −V) is more advantageous in terms of the transition characteristics than in the above-described method. That is, according to the latter method, differences in the transition characteristics due to power voltage fluctuations of a motor and load fluctuations thereof are remarkably decreased, whereby the motion stability is guaranteed.

In addition, in the algorithm of square calculation, there are two ways for executing a digital calculation. One way is a series multiplication method for carrying out binary number multiplication, like a calculation on paper (figure on respective places are added to each other, and the place is raised). The other way is a parallel calculation method (figures in respective places are thoroughly calculated). The former is more recommendable in terms of reducing the number of logic gate elements.

Figure 4:
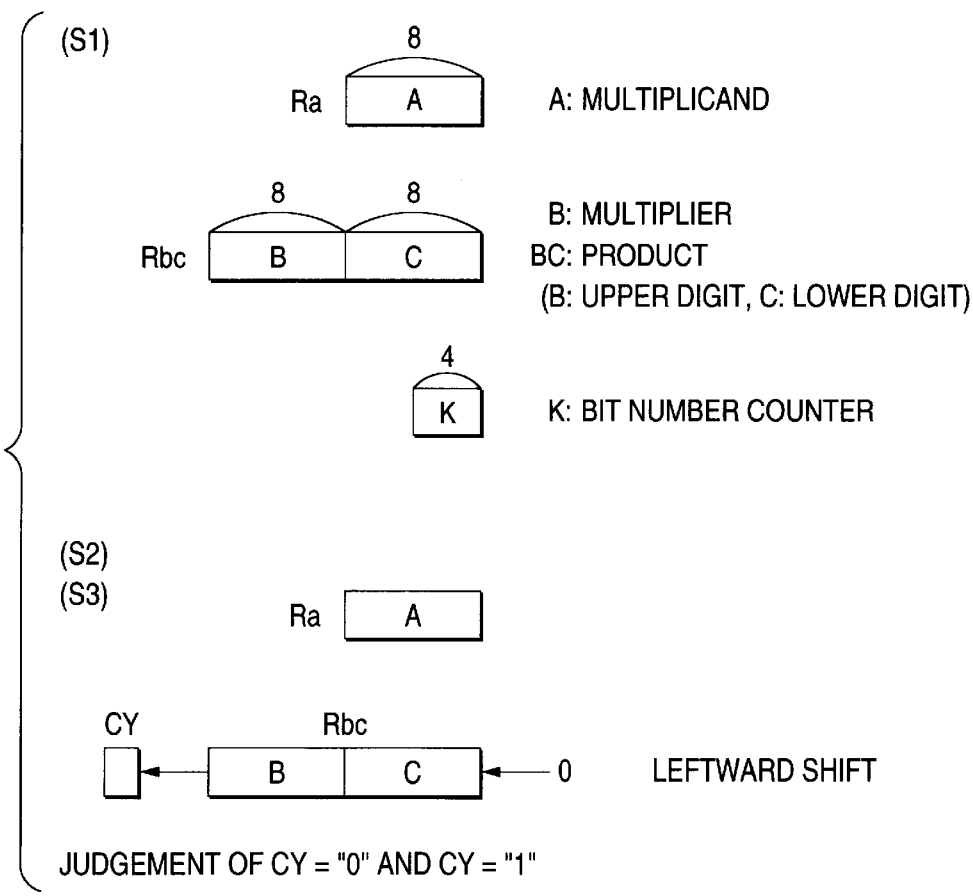
Figure 5:
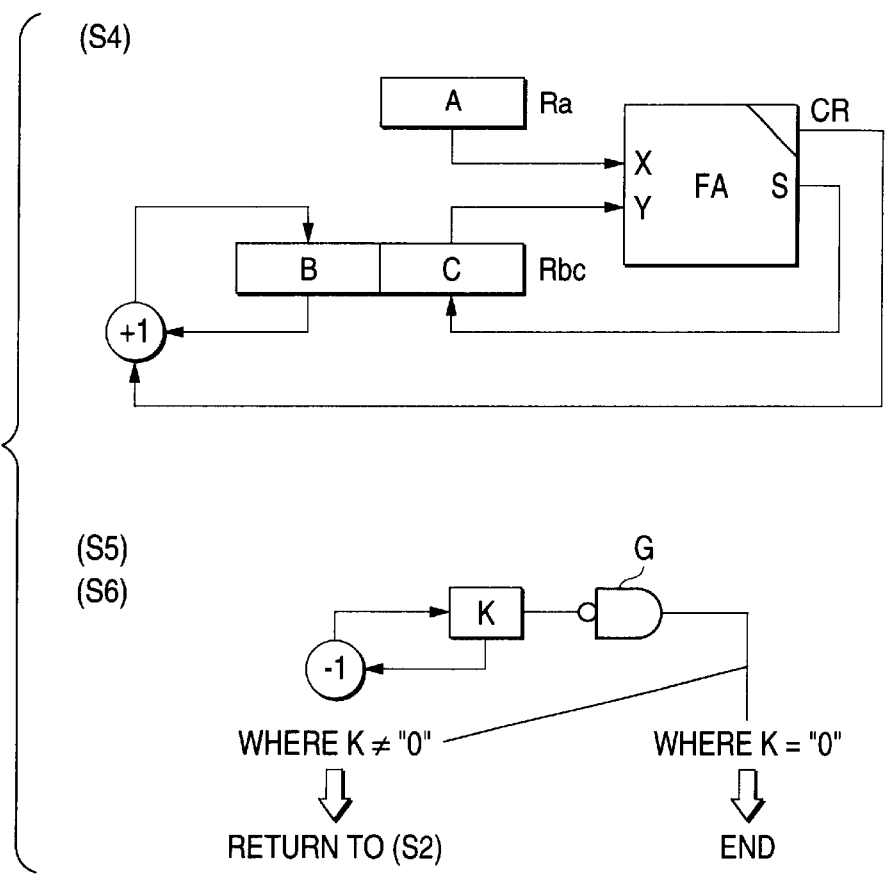
FIG. 5 is a view showing the latter half of the sequence.

To simplify the description, a description is given of an 8-bit multiplication with reference to FIG. 4 and FIG. 5 in compliance with the following sequence (S1) through (S6).

(S1) A multiplicand (hereinafter referred to as "A") is stored in 8-bit register Ra. And a multiplier (hereinafter referred to as "B") is stored in the upper 8 bits of 16-bit register Rbc (In this state, the lower 8-bit data C is "0"). A counter K is prepared to count the number of bits, wherein the default thereof is set to [K=8="1000"] (in the case of 8-bit).

(S2) A logic shift of the left 1 bit is executed for register Rbc, whereby the uppermost bit of B is obtained in register [CY]. Also, "0" is supplemented in the lowermost bit of C.

(S3) If the content of the register CY is zero [CY="0"], the process advances to Step (S5) without doing anything. If [CY="1"], the process advances to Step (S4) (See FIG. 5).

(S4) The content of the register Rbc and content of the register Ra are added to each other, and the result is stored in the register Rbc (BC+A→BC).

(S5) Decrement of the counter K is executed regardless of the addition in Step (S4) (K−1→K). (S6) If [K=0], the calculation is terminated. If not, the process is returned to Step (S2).

Also, Step (S4) can be easily described by using a full adder [FA] and an incrementor (shown by [+1] in circle) as shown in an equivalent circuit in FIG. 5). That is, the content (A) of the register Ra is sent out as an input X of the full adder FA, and the lower 8 bits (C) of the register Rbc are sent out as an input Y. The result (S) of addition is returned to the lower 8 bits oft he register Rbc. And, carry [CR=1] is added by [+1] to the upper bit bits of the register Rbc via the incrementor (B+1→B), wherein a place raising process is executed.

Also, steps (S5) and (S6) can be described by using a decrementor (shown by [1] in circle) and a logic gate G as shown in the lower diagram of FIG. 5. Calculation (k−1→K) to take out the content of the counter K and subtract 1, and a process of notifying the termination of the calculation, in which the logic gate G outputs an H level signal when [K=0], are shown.

Through the above processes, the results (A and B) of multiplication will be obtained in the register Rbc. For example, the level is lowered to a 4-bit calculation (Set K=4="100"), and a multiplication between A=1101 (=13) and B=1011(=11) is illustrated below: The calculation proceeds in compliance with the following steps:
(1) BC=10110000, CY=0, K=100
(2) BC=01100000, CY=1, K=100
(3) BC=01101101, CY=1, K=011
(4) BC=11011010, CY=0, K=011
(5) BC=11011010, CY=0, K=010
(6) BC=10110100, CY=1, K=010
(7) BC=11000001, CY=1, K=001
(8) BC=10000010, CY=1, K=001
(9) BC=10001111, CY=1, K=000

Also, it is a matter of course that a square calculation is carried out as [A=B]

Next, a description is given of an integration calculation according to the invention.

In the present invention, an integration calculation is not uniformly executed in the transition control, but situations of changes in the target value and the present value with respect to position control (optical axis control) are always detected, and the operation frequency of integration and frequency of PWM waves are adequately controlled according to the corresponding situations.

Figure 6:
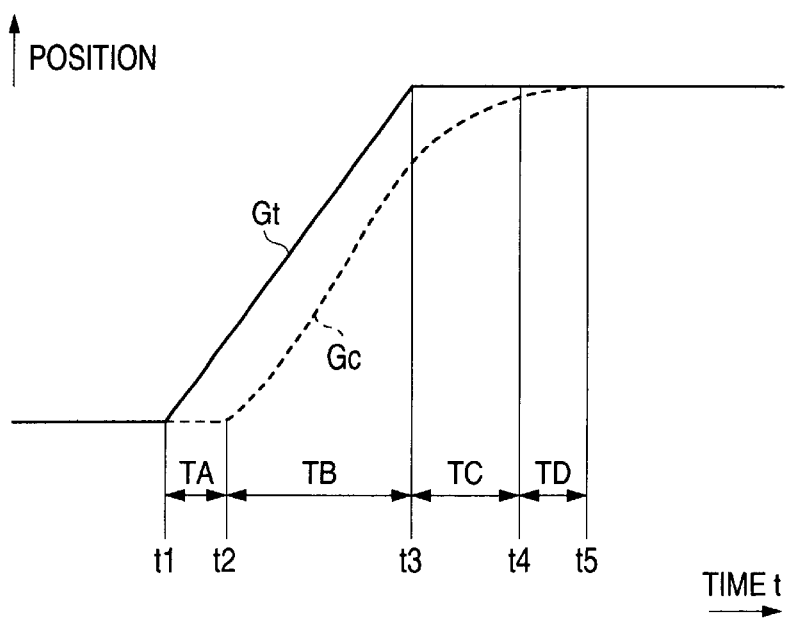
FIG. 6 is a graph describing an integration calculation process.

FIG. 6 generally shows a per-time change of the present value (refer to graph line Gc) that follows a per-time change in the ramp-like target value (refer to graph line Gt) shown by a solid line.

As shown in the drawing, with respect to the time axis [t] shown as the abscissa, an interval from the point (t=t1) of rise of a signal, to the point (t=t5) of time when [Target value=Present value] is obtained, is divided into four terms as shown below.

Term TA (t=t1 to t2)
Term TB (t=t2 to t3)
Term TC (t=t3 to t4)
Term TD (t=t4 to t5)

First, the motion status in Term TA shows that the present value does not change although a change in the target value appears. This is because, based on the relationship of [Stationary friction force>Kinetic friction coefficient], more energy is required when motion begins than during motion. Therefore, it is preferable that, in this state, the value of integration is quickly increased by carrying out an integration calculation based on the frequency of the predetermined sampling rate, in order to increase the amount of control, whereby the commencement of motion is smoothly executed.

In the next coming term TB, it is recognized that changes occur in both the target value and the present value. That is, the motion status is such that the motion will continue by inertia after motion is started. Therefore, it is important to reduce the amount of control to an amount below the amount required when motion commences. Therefore, it is preferable that the error to be added to the amount of control as an amount of integration is regulated to zero, and the amount of integration is reduced in line with the elapse of time.

In the next term TC, since the present value still changes although the target value becomes constant, integration is commenced again to decrease the constant deviation. However, the amount of control quickly increases if the integration is executed at the frequency of the same sampling rate as that in the case of term TA, and the present value exceeds the target value, resulting in overshoot. So, it is preferable that the amount of integration is gradually increased by shifting the frequency down from the regulated value (for example, from $\frac{1}{5}$ to $\frac{1}{10}$ or so), and the present value is drawn near the target value.

In the final term TD, since the error between the target value and the present value is slight, the duty cycle of the PWM wave that is outputted by the pulse width modulating control portion 16 is decreased so as to be small. Therefore, the PWM frequency (or switching frequency), that has been constant until now, is stepwise reduced to be, for example, ½, ¼, ⅛, and so on—or it is consecutively reduced—whereby the present value is controlled to be slowly drawn near the target value by increasing the pulse width. However, at the moment when the error enters the scope of the dead band, the amount of integration is made to be zero, thereby suppressing the overshoot of the present value.

Also, as the amount of control becomes slight in accordance with the present value being drawn near the target value, the duty cycle of the PWM wave becomes very slight by only the control of the duty cycle in which the PWM frequency is made constant. Before long, such a situation occurs where the motor follows the amount of control (out of the scope of the dead band) and will not operate.

Therefore, increasing the duty cycle of the PWM wave so that the motor operates is considered a countermeasure to the above-described problem. If this countermeasure is employed, the result of the PID calculation, which has been performed in this connection, will not reflect the control. For example, there may be a risk that a problem—such as the overshoot of the present value beyond the target value—occurs.

To prevent such a problem from occurring, if the PWM frequency is gradually reduced without changing the duty cycle of the PWM wave, the pulse width per pulse interval increases so that the motor can rotate. That is, in this method, the mean value of energy supplied to the motor corresponds to the result itself of the PID calculation, whereby, advantageously, the present value is smoothly and gradually drawn near the target value while absorbing unevenness of the load and power source voltage.

As described above, with respect to smooth rotation control of the motor, it is favorable that a situation of per-time changes is always detected in terms of the target value and the present value for the position control, and that the operating frequency of integration is controlled to become lower in the case where a change is recognized in only the present value as opposed to the case where a change is recognized in only the target value. Further, in the case where both the target value and the present value are changed by a decrease, or no change is recognized, it is favorable, in terms of improvement in the positioning accuracy, that the frequency of the PWM wave is controlled to gradually become lower in line with the elapse of time.

1. Embodiments of the Invention

FIG. 7 through FIG. 20 show one embodiment in which the present invention is applied to an optical-axis-adjusting unit of a vehicle illuminating device.

Also, where the invention is applied to a dynamic auto-leveling unit that sensitively controls the direction of the optical axis of lighting in line with a change in the vehicle posture, for example, the irradiating direction control portion 4 of FIG. 1 is composed of an electronic control unit (ECU). Simultaneously, a sensor installed for an electronic control air suspension is used as a vehicle height sensor, and a sensor installed for an anti-skid brake system (ABS) may be used as a vehicle velocity sensor.

Figure 7:
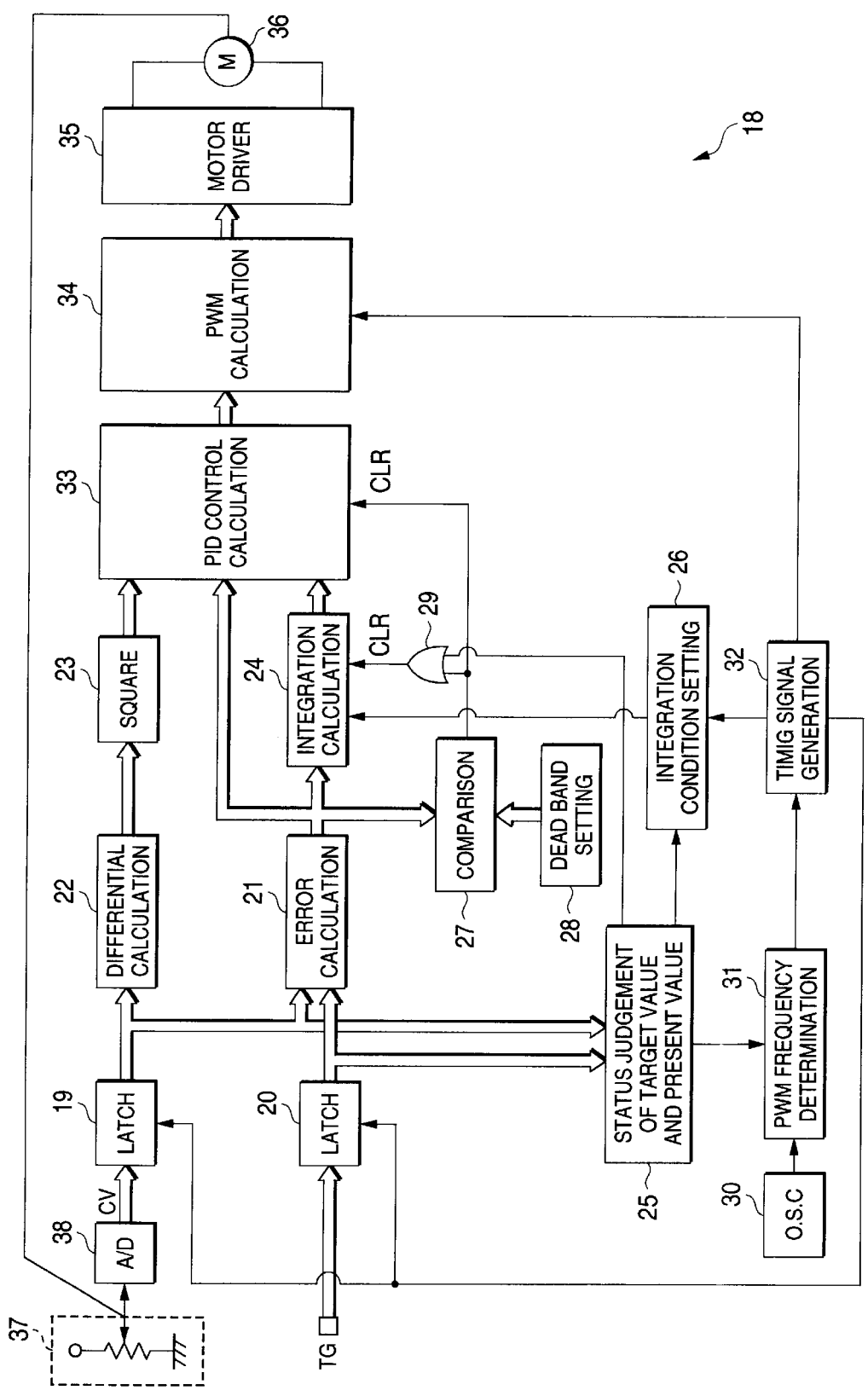
FIG. 7 shows one embodiment of the invention along with FIG. 8 through FIG. 20, and this drawing is a block diagram showing the entire construction.

FIG. 7 is one circuit block showing one example of the whole construction of a motor control circuit 18 including the following elements (Figures in parentheses indicate reference number in the accompanying drawings).

Latch circuit (19)
Latch circuit (20)
Error calculation circuit (21)
Differential calculation circuit (22)
Square calculation circuit (23)
Integration calculation circuit (24)
Portion (25) for judging the status of the target value and present value
Integration condition determining portion (26)
Comparator circuit (27)
Dead band setting circuit (28)
2-input OR (logic sum) circuit (29)
Oscillator (30)
PWM frequency determining portion (31)
Timing signal generating portion (32)
PID control amount calculation portion (33)
PWM calculation portion (34)
Motor driver (35)
Direct current motor (36)
Position detector (37)
(Analog→Digital) converting circuit (38)

First, the target value data TG(8-bit signal) is sent, via the latch circuit 20, to the error calculation portion 21 and the portion 25 for judging the status of the target value and present value.

The optical axis is controlled by controlling the position of the direct current motor 36 and the velocity, wherein the irradiating direction of the reflection light is controlled by, for example, varying the inclination angle of the reflection mirror in the perpendicular plane in compliance with the rotation angle of the motor. For example, a potentiometer is used as the motor-position detector 37, and after the detection voltage is digitally converted by the 8-bit A/D converting circuit 38 (the full scale of the potentiometer is expressed by a 8-bit binary number system), the digitally converted data are sent, via the latch circuit 19, to the error calculation portion 21, to the differential calculation portion 22, and to the portion 25, for judging the status of the target value and present value.

The error calculation portion 21 is provided to obtain an error between the target value from the latch circuit 20, and the present value from the latch circuit 19, wherein the error data (8-bit data) are sent to the integration calculation circuit 24, to the PID control amount calculation portion 33, and to the comparator circuit 27.

The differential calculation circuit 22 is provided to obtain velocity data by calculating the per-time first-order derivative (accurately, a differential) with respect to the present value data from the latch circuit 19. The output (8-bit data) from the differential calculation circuit 22 is sent to the PID control amount calculation portion 33 as 16-bit data after having been squared by a squaring circuit 23 (described later).

The integration calculation circuit 24 sends a result, which was obtained by integrating the 8-bit data from the error calculation portion 21 in terms of time, to the PID control amount calculation portion 33 as 12-bit data. Also, the operating frequency of integration is determined by a clock signal from the integration condition determining portion 26 (described later), and the value of integration is cleared to be zero upon receiving a signal (CLR) from the OR circuit 29.

The comparator circuit 27 judges whether or not the error data enter the dead band, by comparing the 8-bit data from the error calculation portion 21 with the set value (8-bit data) of the dead band, which is set by the dead band setting portion 28. The comparator circuit 27 then sends binary data showing the result of judgment to the OR circuit 29, and simultaneously sends a clear signal (CLR) to the PID control amount calculation portion 33 where the error data entered the dead band, whereby the control amount is cleared to zero.

The portion 25 for judging the status of the target value and present value sends an instruction signal, for determining the integration conditions, to the integration condition determining portion 26 and to the PWM frequency determining portion 31 by monitoring the per-time changes of the target value and present value. That is, as described above, where a change is recognized in only the target value, the operating frequency of integration is used as a regulated value. Also, where changes are recognized in both the target value and present value, the amount of error to be added, according to the amount of time, is regulated to be zero. Further, where a change is recognized in only the present value, a control instruction to reduce the operating frequency of integration to a value below the regulated value is sent to the integration condition determining portion 26. Lastly, where slight changes are made in both the target value and present value, a control instruction to gradually lower the frequency of the PWM wave is sent to the PWM frequency determining portion 31 in line with a decrease in the amount of change of both the target value and present value.

The oscillator 30 is a circuit that generates the basic frequency signal of the PWM control, and the corresponding signal is sent to the PWM frequency determining portion 31, wherein the PWM frequency (switching frequency) is determined.

The timing signal generating portion 32 generates signals based on the signals from the PWM frequency determining portion 31 and sends clock signals to the latch circuits 19 and 20. Additionally, the timing signal generating portion 32 sends control clock signals to the integration condition determining portion 26 and PWM calculation portion 34.

The PID control amount calculation portion 33 multiplies respective data values sent from the error calculation portion 21, the square circuit 23, and the integration calculation circuits 24, by respective predetermined coefficient values, and calculates an amount of control by a weighting process in which addition and subtraction are performed. The output thereof is sent to the PWM calculation portion 34.

The PWM calculation portion 34 generates a PWM wave of 256 graduations, the duty cycle of which is varied and controlled in response to a control instruction from the PID control amount calculation portion 33, and sends the PWM wave to a motor driver 35 as a control signal.

The motor driver 35 has a half-bridge type construction using a set of semiconductor switching elements (FET, etc.), wherein respective switching elements are controlled so as to be contrarily switched upon receiving a control signal from the PWM calculation portion 34, whereby the motor current is controlled.

Figure 8:
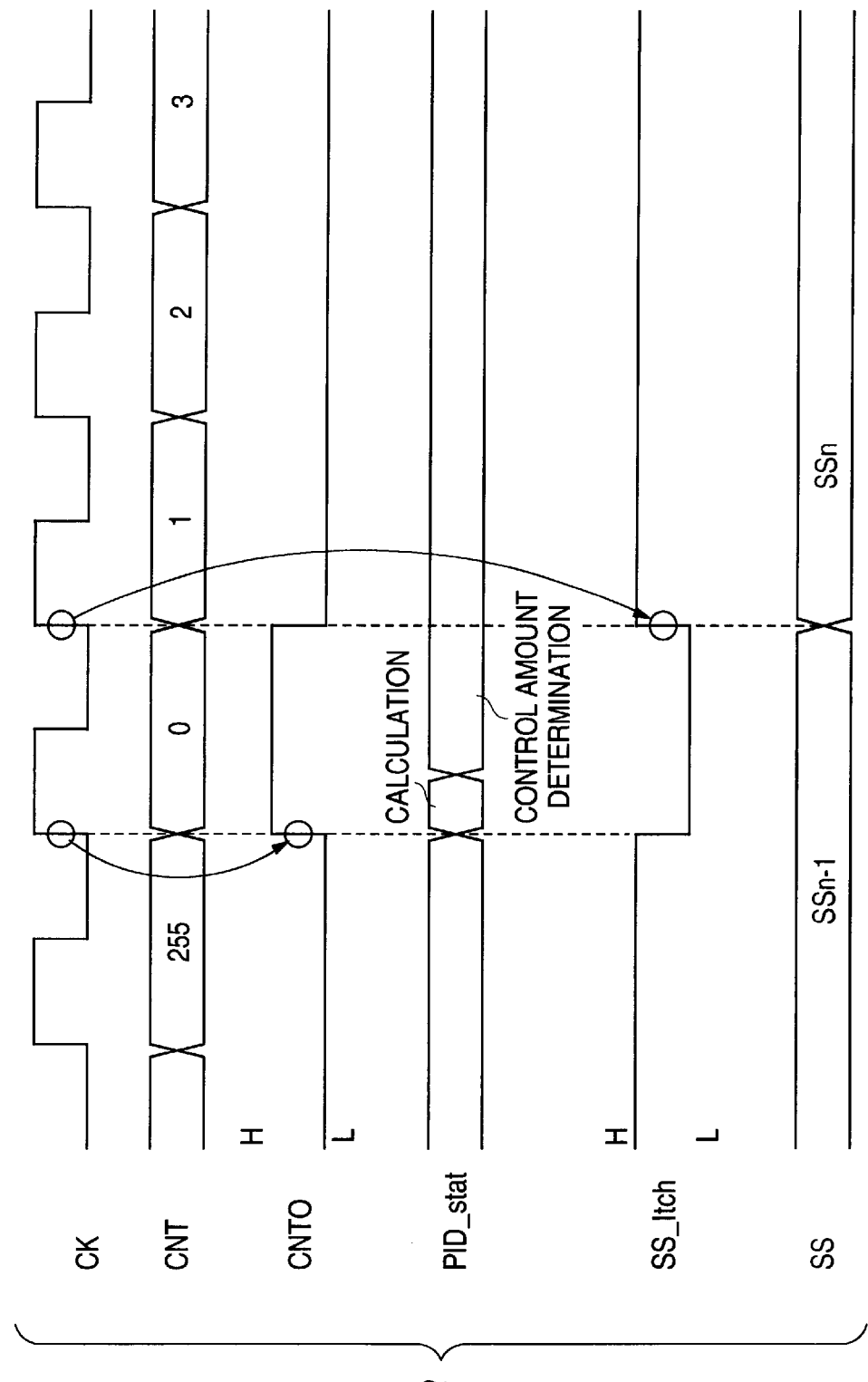
FIG. 8 is a timing chart describing the operation.

FIG. 8 is a timing chart describing the major parts of circuit operation, wherein the meanings of respective signals are as follows;

[CK] is a reference clock signal that is generated by the oscillator 30.

[CNT] is the content of calculation of a counter (described later) provided in the PWM calculation portion 34.

[CNTO] is a detection signal instruction stating whether or not the content of the CNT calculation is zero (wherein the H leveled signal shows detection of zero).

[PID_stat] is a status of PID calculation (during calculation, and determination of the amount of control)

[SS_ltch] is a signal for a latch of the amount of control.

[SS] is the content of the amount of control (SSn−1, SSn).

Also, the amount of control indicates the amount of instruction, which is determined after the PID calculation, and which is sent to the PWM calculation portion 34.

As shown in the drawings, when the content of calculation of the CNT switches from [255] to [0] and returns to the start, the signal CNTO becomes H-leveled in synchronization with the point of time when a signal CK rises, and the PID control amount calculation proportion 33 picks up data from this point of time. The amount of control is determined after the above-described weighting calculation is finished.

Also, the amount of control switches from SSn−1, which it has been until now, to a new value SSn at the point of time when the signal SS_ltch rises (herein, the affix n indicates a natural number index that increases in line with the elapse of time). Also, the signal SS_ltch is an inverted signal (Logic negation signal) of the signal CNTO.

Figure 9:
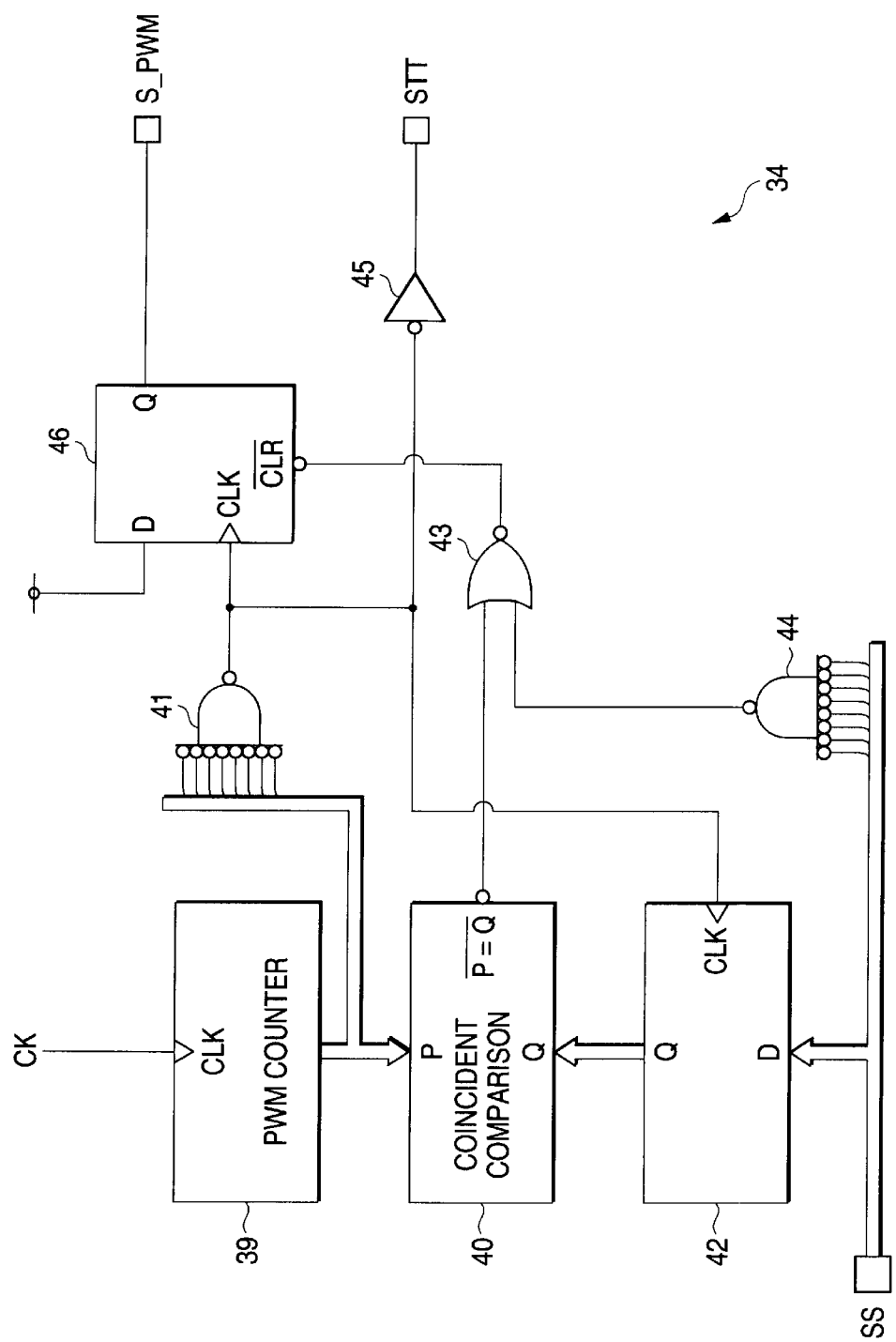

FIG. 9 shows a configurational example of the PWM calculation portion 34.

The signal CK is sent to a clock signal input terminal (CLK) of the PWM counter (8-bit binary counter) 39. The output signal (the content of calculation is [CNT] as described above) of the corresponding counter is sent to one 8-bit input terminal [P] of the comparator (identity comparator) for coincidence comparison, and at the same time, is sent to an L active 8-input and L active 1-output AND (logic product) gate 41.

The control amount SS (8-bit data) from the PID control amount calculation portion 33 is devised so as to be inputted in the other 8-bit input terminal (Q) of the comparator 40 via an 8-bit input/output D flip-flop (Octal D-type flip-flop) 42. The corresponding comparator 40 compares the respective bits of [P] and [Q] with each other, place by place. When all the bits are equal to each other, an output signal (indicated by overlying a line on [P=Q] in the drawings) that becomes an L-leveled signal is sent to the L active 2-input and L active 1-output OR gate 43.

Further, since the control amount SS from the PID control amount calculation portion 33 is sent to the L active 8-input and L active 1-output AND gate 44, zero detection of the amount of control (that is, whether or not the respective bits are made into zero is detected) is carried out, and the detection signal is sent to the remaining input terminals of the above-described OR gate 43.

When the content of calculation of the PWM counter 39 is zero, all the inputs of the AND gate 41 are made L-leveled, whereby the output signal becomes L-leveled at this time. The signal corresponds to the above-described [CNTO] and is a signal to determine the point of commencement of PID calculation. However, since the point of commencement of the calculation is the point of time where the signal level is changed from H-level to L-level, as shown in the drawing, if the signal is inverted via an L active NOT gate 45, it is possible to obtain a signal (this is referred to as "STT") showing the commencement of calculation at the point of time when the signal is changed from L-level to H-level. In addition, in the subsequent stage, the output signal of the AND gate 41 is sent to the clock signal input terminal (CLK) of the D flip-flop 46.

In the D flip-flop 46, an H-leveled signal is provided at the D input terminal, and an output signal (this is referred to as "S_PWM") at the Q output terminal is obtained as PWM wave. Also, a signal produced from this signal becomes a control signal (for example, a gate drive signal of an FET) to the switching element (not shown) that constitutes the motor driver 35. Also, the D flip-flop 46 is provided with a CLEAR terminal (this is indicated by a bar attached on the [CLR] in the drawing) of an L active input, wherein a CLEAR operation is carried out upon receiving an L-leveled signal from the above-described OR gate 43. That is, the clearing is executed when the comparator 40 detects coincidence or the AND gate 44 detects zero.

Additionally, although not being illustrated, the PWM counter 39, comparator 40 and D flip-flops 42 and 46 are devised so as to be cleared by a power ON reset signal that is generated immediately after the power is closed.

Figure 10:
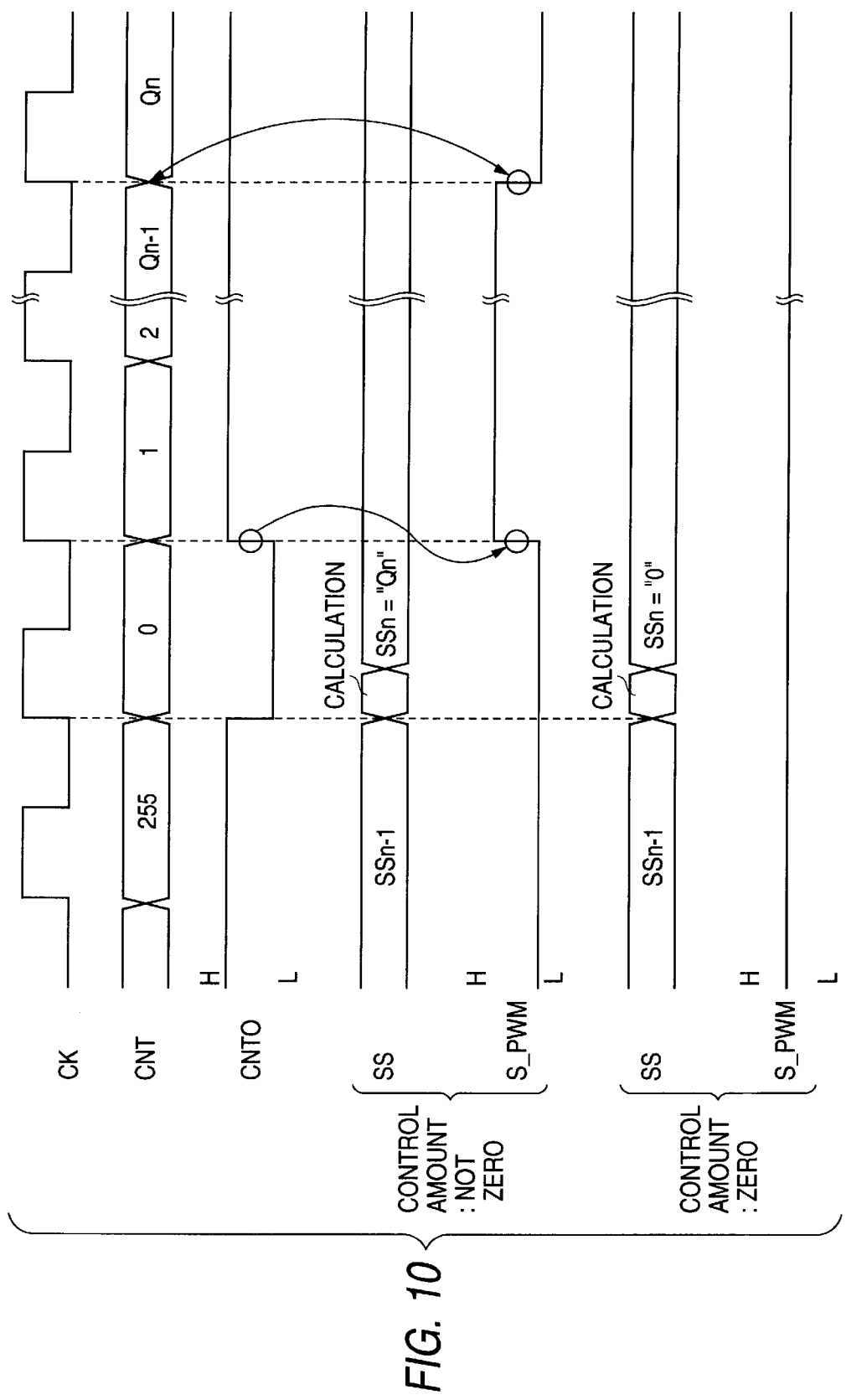
FIG. 10 is a timing chart describing the operation of circuits.

FIG. 10 is timing chart describing the operations of the PWM calculation portion 34, wherein the meanings of the respective signals are as described above. Also, in [CNT] showing the content of calculation, [Qn] indicates a counter value corresponding to the control amount SSn.

FIG. 10 shows the control amount SS in two cases to clarify the difference therebetween. The first case is where SS is not zero, whereas the second case is where SS is zero.

That is, when the control amount is not zero, it is possible to obtain a signal having a width that falls to the L level at the point in time when the content [Qn] of calculation corresponding to the control amount SS changes, after the signal S_PWM rises to the H level from the point in time when the signal CNTO rises to the H level. Also, this is because the output Q of the D flip-flop 46 described above rises at the point of time when the signal CNTO changes from the L level to the H level with respect to the clock signal input into the D flip-flop 46, and the corresponding D flip-flop is cleared by an L-level signal when the comparator 40 detects coincidence between the content of calculation of the PWM counter 39 and the control amount.

On the other hand, when the control amount is zero, since the output of the AND gate 44 is L-leveled and this becomes a CLEAR signal of the D flip-flop 46, the signal S_PWM remains as it is L-leveled. Therefore, it is possible to accurately make the level of the PWM wave into the L level where the control amount is zero.

Next, a description is given of the configuration of respective portions of some of the above-noted circuits.

Figure 11:
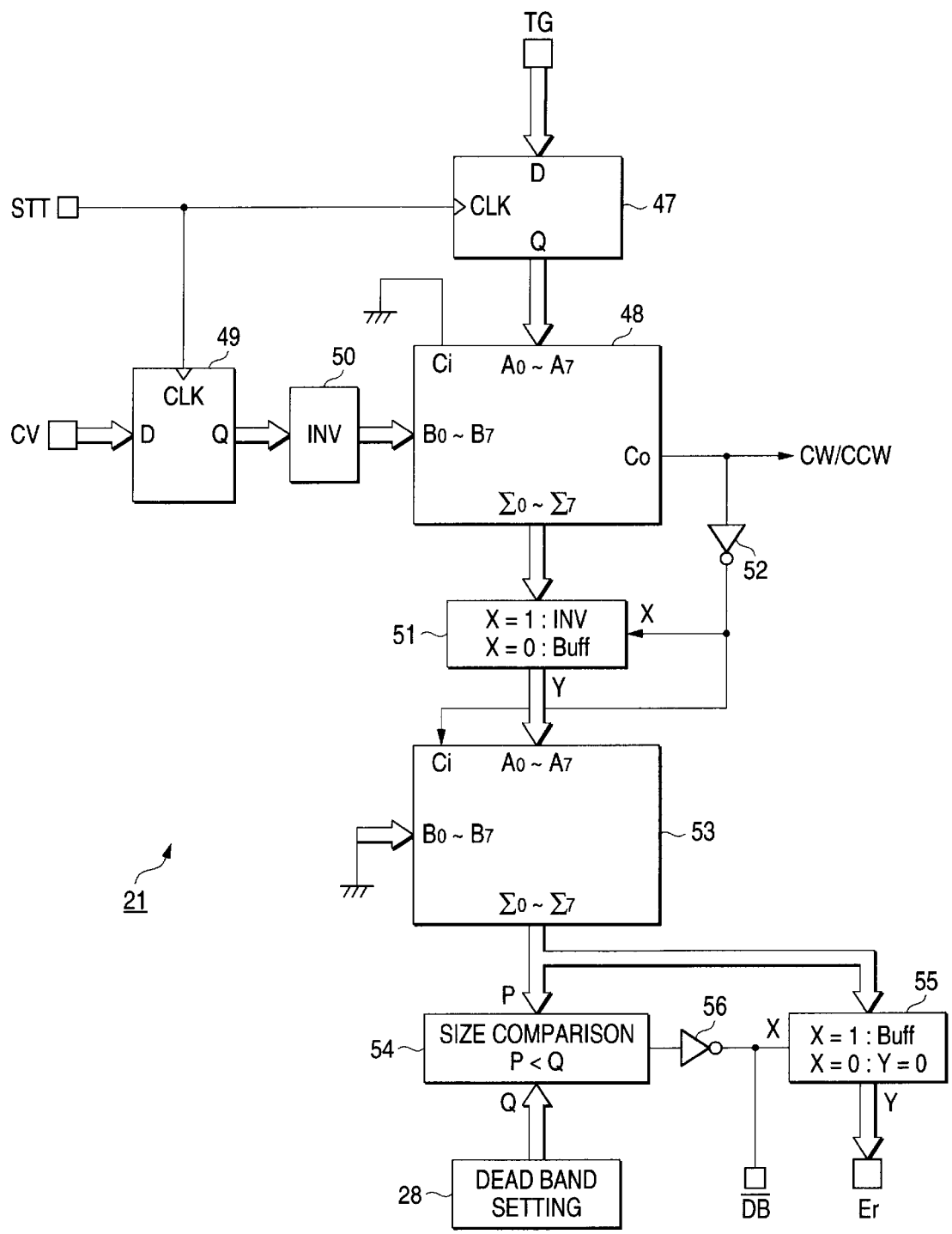
FIG. 11 is a view showing a configurational example of the error calculating portion.

FIG. 11 shows a configurational example of the error calculation portion 21.

The 8-bit target value data TG is first inputted into a register circuit 47. Also, a D flip-flop (Octal D-type Flip-Flop) of 8-bit input and output is used in this circuit, and the above-described calculation commencement signal STT is supplied to the clock signal input terminal (CLK), wherein the 8-bit Q output is sent to the A input terminals (A0 through A7) of an 8-bit full adder 48.

On the other hand, 8-bit present value data (hereinafter referred to as "[CV]") is inputted into a register circuit 49. Also, a D flip-flop (Octal D-type Flip-Flop) of 8-bit input and output is used in this circuit, and the above-described calculation commencement signal STT is supplied to the clock signal input terminal (CLK). Further, the 8-bit Q output is sent to the B input terminals (B0 through B7) of the 8-bit full adder 48 after passing through a bit-inverting circuit 50 (composed of eight NOT gates).

The result of addition by the 8-bit full adder 48 is sent from the 8-bit output terminals (Σ0 through Σ7) to the 8-bit input terminal of a logic circuit 5 1. Additionally, the output signal of a carry-out terminal (Co) is supplied to the control input terminal [X] of the logic circuit 51 via a NOT gate 52 and, at the same time, is sent to a carry-in terminal (Ci) of the 8-bit full adder 53. Also, the carry-in terminal [Ci] of the 8-bit full adder 48 is made L-leveled.

In the logic circuit 51, the data that are obtained from the 8-bit output terminal [Y] are determined in response to the signal level of [X], wherein, when [X=1] (that is, when the output signal of the NOT gate 52 is H-leveled), bit-inverted data of 8-bit input are obtained at [Y](this functions as an inverter [INV]), and when [X=0], the data of 8-bit input are obtained at [Y] as they are (this functions as a buffer [Buff]). Also, the circuit is composed of, for example, eight two-input exclusive logic sum (Ex-OR) gates, and is a circuit required for negation processing together with the NOT gate 52 (dependent on the use of two complements for subtraction). Further, a signal that is obtained from the carry-out terminal [Co] of the 8-bit full adder 48 is used as a signal (this is referred to as [CW/CCW]) indicating the direction of rotation of a motor.

Although, in the 8-bit full adder 53, 8-bit data from the output terminal [Y] of the above-described logic circuit 51 are inputted into the input terminals (A0 through A7), the B input terminals (B0 through B7) are all made L-leveled. Data that are obtained from the 8-bit output terminals (Σthrough Σ7) are inputted into one 8-bit input terminal [P] of magnitude comparators 54 for comparison of sizes (This comparator composes the above-described comparator circuit 27) and into the 8-bit input terminal of the logic circuit 55.

8-bit data from the dead band setting portion 28 are supplied to the other 8-bit input terminal [Q] of the magnitude comparator 54. Also, the setting scope of the dead band, permitted in view of the optical axis control, is regulated in the dead band setting portion 28 in advance.

When the data value of the P input is smaller than the data value of the Q input, that is, where the error is not in the dead band, the magnitude comparator 54 outputs a signal that will be made H-leveled, and the signal is sent to the control input terminal [X] of the logic circuit 55 via the NOT gate 56. Furthermore, in the case where an error value entered the dead band, the optical signal of the NOT gate 56 becomes L-leveled. Attention is paid to this and a bar sign is attached on the [DB] in the drawing.

In the logic circuit 55, data that are obtained from the 8-bit output terminal [Y]are determined according to the states of the signal level of [X], wherein, when [X=1] (that is, the output signal of the NOT gate 56 is H-leveled), the 8-bit input data are obtained at [Y] as they are (this functions as a buffer [Buff]), and when [X=0], the data of [Y] are made zero (Y=0). Also, in this circuit, respective digit signals from the 8-bit output terminals (Σ0 through Σ7) of the full adder 53 are supplied to one input terminal of the respective gates by using, for example, eight two-input AND gates, and output signals of the NOT gate 56 may be supplied to the other input terminals.

The 8-bit data that are obtained from the output terminal [Y] of the logic circuit 55 are error data [Er] (however, the error is zero in the dead band).

Figure 12:
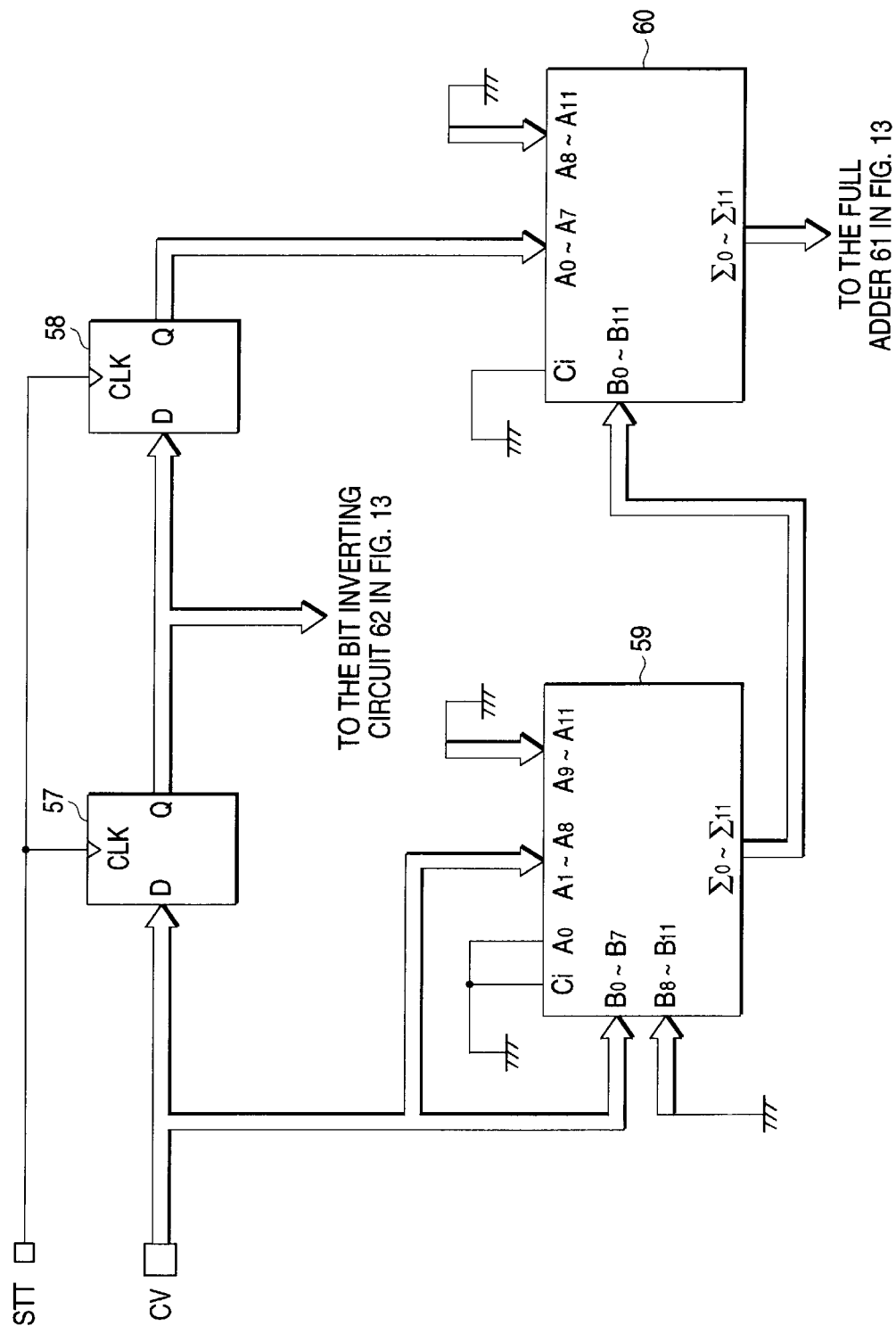
Figure 13:
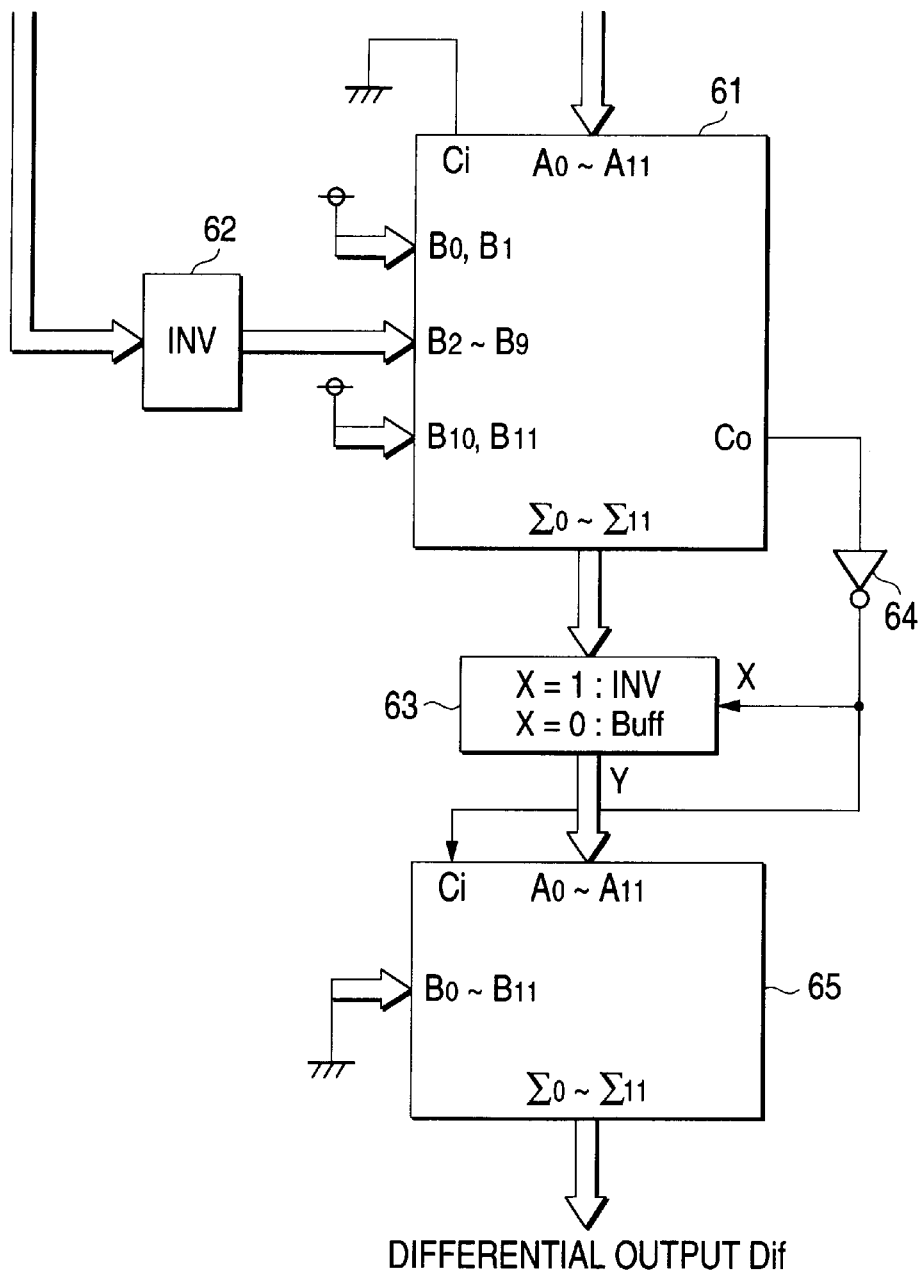
FIG. 13 is a view showing a construction pertaining to the latter half of the differential calculation process.

FIG. 12 and FIG. 13 show a configurational example of a differential calculation circuit 22, wherein the 8-bit present value data [CV], wherein have been digitalized by passing through the A/D converting circuit 38 from the position detector 37, are sent to an 8-bit register 57 and a 12-bit full adder 59.

Integrated circuits (Ics) (for example, Octal D-type Flip-Flop with Clear: equivalent to 74HC273) that is provided with eight D flip-flops are used for the 8-bit register 57, and the respective D flip-flops are disposed in parallel, whereby data of the respective bits are inputted into the D input terminal. Also, the above-described calculation commencement signal (STT) is supplied to the clock signal input terminal (CLK).

An 8-bit register 58, into which the Q output of the 8-bit register 57 is inputted, is further provided in the rear stage of the 8-bit register 57. ICs equivalent to the 74HC273 are used for the 8-bit register 58, wherein data of the respective bits are inputted into the D input terminal of the respective D flip-flops. Also, the calculation commencement signal (STT) is supplied to the clock signal input terminal (CLK) of the register 58.

Therefore, the content showing the present value data of the motor at time $[t_k]$ is indicated as $[f(t_k)]$ in compliance with the function notation, the 8-bit register 57 of the first stage receives the corresponding data, wherein the data $[f(t_{k-1})]$ (in the bracket, an index [k−1] of a discrete time is attached to [t]) one time unit before the present point is obtained as an output, and data $[f(t_{k-2})]$ (in the bracket, an index [k−2] of a discrete time is attached to [t]) two time units before the present point is obtained as an output of the 8-bit register 58 of the next stage.

In a 12-bit full adder 59 (for example, 4-bit binary full adder: composed of three elements, equivalent to 74HC283, disposed in parallel to each other), the present value data CV are inputted in the 1st through the 8th bit terminals [A1] through [A8] of the A-input terminals (A0 through A11) and the 0th through the 7th bit terminals [B0] through [B7] of the B-input terminals. That is, $[2·f(t_k)]$ that is doubled by shifting the data CV to the right side is inputted for the A-input and the data CV is inputted for the B-input as they are (that is, $[f(t_k)]$), 12-bit data of $[2·f(t_k)+f(t_k)=3·f(t_k)]$ are outputted from the output terminals (Σ0 through Σ11) of the full adder 59. Also, L-leveled signals are supplied to the carry-in terminal (Ci), to a terminal [A0], to terminals [A9] through [A11] (upper 3 bits), and to terminals [B8] through [B11] (upper 4-bits).

A 12-bit full adder 60 positioned in the next stage is provided for adding the above-described $[3·f(t_k)]$ to $[f(t_{k-2})]$, and 8-bit data $([f(t_{k-2})])$ from the 8-bit register 58 that are inputted in the terminals [A0] through [A7] of the A-input terminals. At the same time, 12-bit data that are outputted by the above-described full adder 59 are inputted into the terminals [B0] through [B11] of the B-input. Also, L-leveled signals are supplied into the terminal [Ci] and into terminals [A8] through [A11].

The 12-bit data of $[3·f(t_k)+f(t_{k-2})]$, which is the result of calculation that the 12-bit full adder 60 outputs through the output terminals (Σ0 through Σ11), are sent to the A-input terminals [A0] through [A11] of the 12-bit full adder 61 (See FIG. 13) positioned in a further next stage.

The Q output (showing $[f(t_{k-1})]$)from the 8-bit register 57 are inputted into the terminals [B2] through [B9] of the B-input terminals after passing through a bit-inverting (logic negation) circuit 62. That is, a figure, which is quadrupled by the rightward shifting of two bits in the B-input stage after having obtained a complement of 1 (after all bits are inverted) in order to multiply the $[f(t_{k-1})]$ by a coefficient [−1], (that is, $(-4·f(t_{k-1}))$), is obtained. Also, an addition process is carried out, wherein the above figure is added to the above-described $[3·f(t_k)+f(t_{k-2})]$. The result of calculation is outputted from the output terminals (Σ0 through Σ11). Also, an L-leveled signal is supplied to the terminal [Ci], and an H-leveled signal is supplied to the terminals [B0],[B1], [B10], and [B11] pertaining to the B-input.

A logic circuit 63, provided in the rear stage of the full adder 61, is required for a negation process, and determines whether or not a complement process is performed, based on whether the logic value of a (sign-bit) signal outputted from the carry-out terminal [Co] of the full adder 61 is [1] or [0]. That is, where the result of calculation is a negative figure, a [0] signal can be obtained from the terminal [Co], wherein a signal (X=1) that has become [1] by inverting the signal by the NOT gate 64 is sent to the control input terminal of the logic circuit 63. Therefore, in the case of [X=1], the result of having inverted all the bits (Invert [INV]) is sent to the A-input terminals (A0 through A11) of the 12-bit full adder 65 and, at the same time, a complement of 2 in regard with a negative value is obtained by sending a signal of the logic value [1] outputted by the NOT gate 64 to the terminal [Ci] of the full adder 65. Also, where the result of calculation is a positive figure, a signal of [1] is obtained from the terminal [Co]. Therefore, a signal (X=0) that has become [0] by inverting the signal by the NOT gate 64 is sent to the control input terminal of the logic circuit 63. Thereby, in the case of [X=0], all the bits are sent to the A-input terminals [A0] through [A11] of the 12-bit full adder 65 of the next stage as they are (that is, in this case, the logic circuit 63 merely functions as a buffer [Buff] and, at the same time, a signal of the logic value [0] that is outputted by the NOT gate 64 is sent to the terminal [Ci] of the fill adder 65. Furthermore, the circuit may be composed of 2-input Ex-OR (exclusive logic sum) gates equivalent to all the bits (wherein the terminals Σ0 through Σ11 of the fill adder 61 are connected to one input terminal of the respective gates, and output terminals of the NOT gate 64 are connected to the other input terminals.

Since an L-leveled signal is supplied to the B-input terminals [B0] through [B11] in the fill adder 65 positioned in the final stage, respectively, no influence is given to the output from the above-described circuit, wherein a positive figure remains as it is, and only a process of adding a logic value [1] from the terminal [Ci] to a negative figure is carried out (a process of a complement of [1] has been calculated in the logic circuit 63). Thereafter, 12-bit data (this is referred to as "[Dif]") equivalent to the result of calculation of $[3·f(t_k)-4·f(t_{k-1})+f(t_{k-2})]$ will be obtained from the output terminals [Σ0] through [Σ11]. In addition, this corresponds to a numerator of Expression (5) described above (or it may be considered that the sampling time is regarded as "Δh=½").

Figure 14:
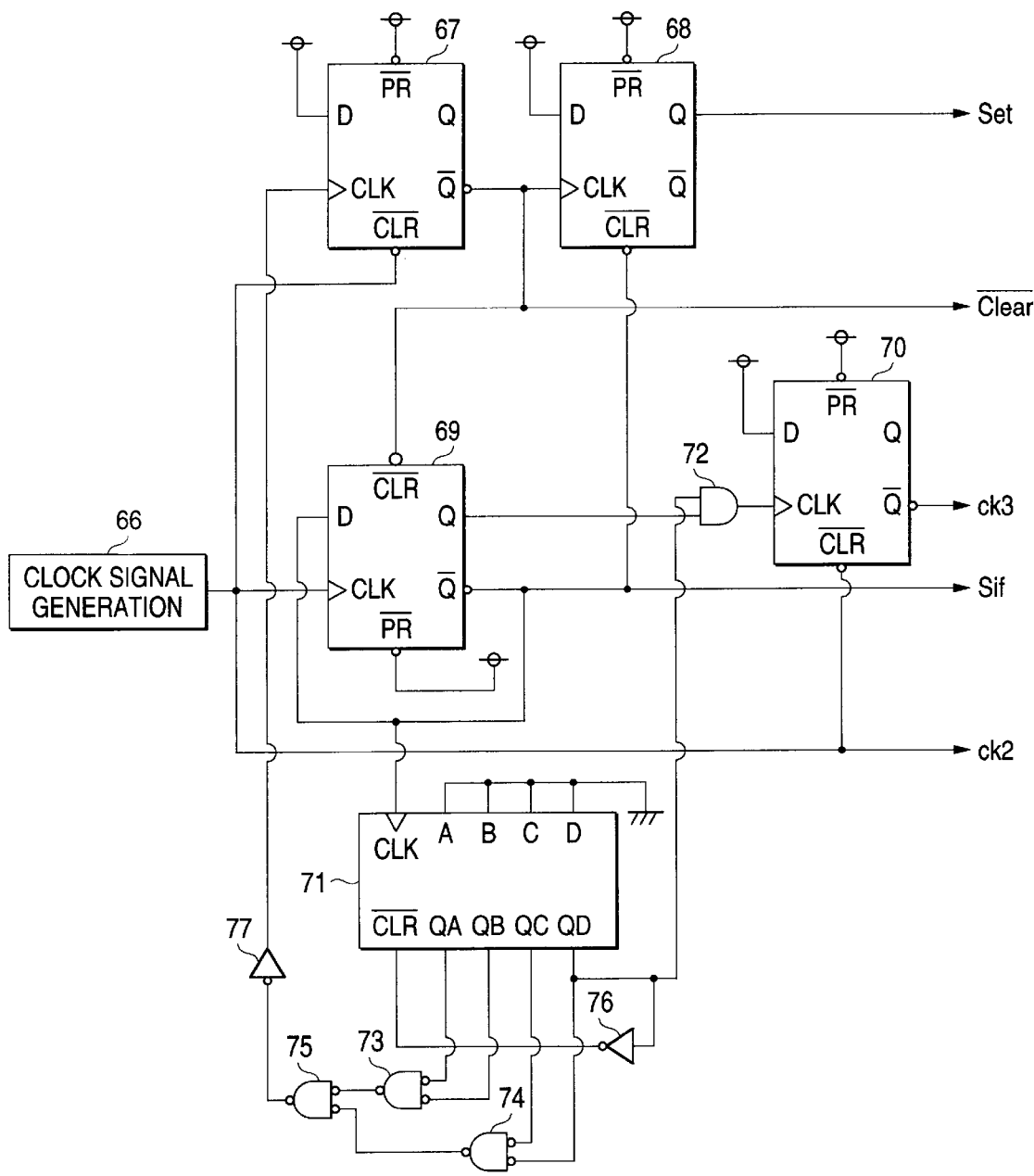
Figure 15:
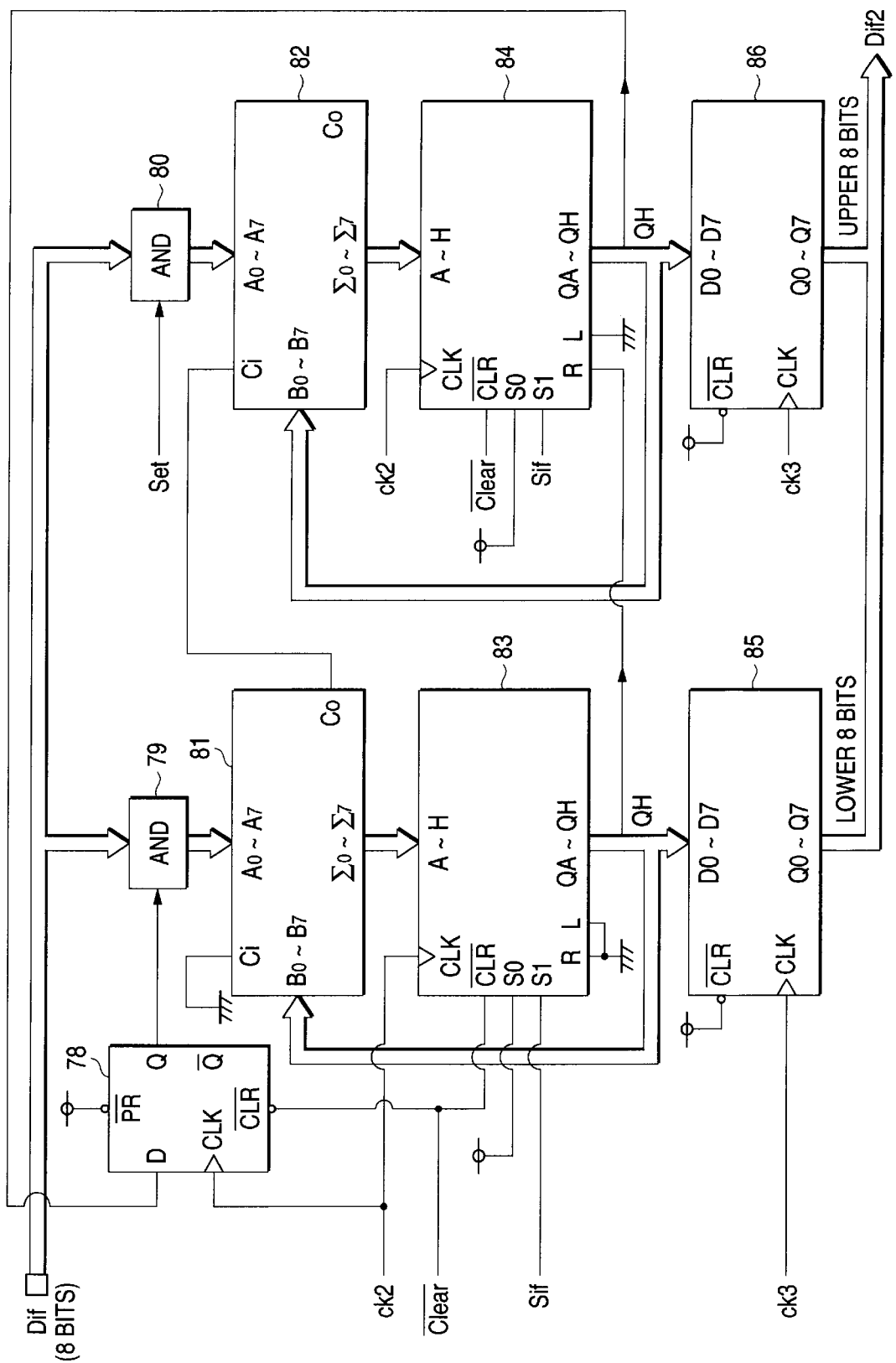
FIG. 15 is a view showing a construction pertaining to the calculation process.

FIG. 14 and FIG. 15 show a configurational example of a square circuit 23, which is provided with the following components (figures in the parentheses correspond to reference numbers in the drawings).

Clock signal generating portion (66)
D flip-flops (67 through 70)
Counter (71)
2-input AND gate (72)
L active 2-input and L active 1-output AND gates (73 through 75)
NOT gate (76)
L active input NOT gate (77)

A signal (referred to as [ck2]) that is obtained from the clock signal generating portion 66 is supplied to the clock signal input terminal (CLK) of the D flip-flop 69. In addition, flip-flops having a preset terminal (in the drawings, a bar sign [⁻] is attached onto the sign [PR] for illustration) of an L active input and a clear terminal (in the drawing, a bar sign [⁻] is attached onto the sign [CLR] for illustration) of L active input are used for the respective D flip-flops, and a 4-bit binary counter (for example, those equivalent to 74HC163) is used for the counter 71 (This corresponds to the above-described counter [K]).

In the D flip-flop 67, the D-input is made H-leveled, and a signal ck2 is supplied to the CLEAR terminal. Also, a signal that is obtained from the Q bar output terminal (in the drawings, a bar sign [⁻] is attached onto the sign [Q]) is supplied to the clock signal input terminal (CLK) of the D flip-flop 68 of the rear stage, and to the CLEAR terminal of the D flip-flop 69, and it is used as a CLEAR signal (Clear) to circuits described later. In addition, the preset terminal of the D flip-flop 67 is made H-leveled.

In the D flip-flop 68, the D input is made H-leveled, and the Q output signal is used as a multiplication setting signal (this is referred to as [Set]). Also, the preset terminal of the D flip-flop is made H-leveled.

In the D flip-flop 69, the D input terminal is connected to the Q-bar output terminal, and the Q-bar output signal is also supplied to the CLEAR terminal of the D flip-flop 68, wherein it is used as a control signal (Shift/Load signal, and this is referred to as [Sif]) with respect to the shift registers 83 and 84 described later. Also, the Q output signal is supplied to one input terminal of the 2-input AND gate 72. Further, the preset terminal of the D flip-flop 69 is made H-leveled.

In the D flip-flop 70, the D input is made H-leveled, an output signal of the AND gate 72 is supplied to the clock signal input terminal (CLK) and, at the same time, a signal ck2 is supplied to the CLEAR terminal. Also, the Q-bar output signal is used as a latch clock signal (this is referred to as [ck3]).

The Q-bar output signal (Sif) of the D flip-flop 69 is supplied to the clock signal input terminal (CLK) of the counter 71, and all the data input terminals (A through D) of the counter 71 are made L-leveled. Also, in connection with the four output terminals (QA, QB, QC and QD), the QA and QB are connected to the respective input terminals of the AND gate 73, and the QC and QD are connected to the respective input terminals of the AND gate 74. Further, the output of the terminal QD is sent to the AND gate 72 and, at the same time, is supplied to the CLEAR terminal (in the drawings, a bar sign [⁻] is attached onto the [CLR]) of the counter 71 via the NOT gate 76. In addition, AND gates 73 through 75 are L active 2-input and 1-output AND gates.

The output signal of the AND gate 73 is supplied to one input terminal of the AND gate 75, while the output signal of the AND gate 74 is supplied to the other input terminal of the AND gate 75. Also, the output signal of the AND gate 75 is supplied to the clock signal input terminal (CLK) of the D flip-flop 67 via the NOT gate 77.

FIG. 15 shows a circuit configuration of a part where a square calculation is carried out, which is provided with the following components (figures in the parentheses indicate reference numbers in the drawings).

D flip-flop (78)
AND circuits (79 and 80)
8-bit full adders (81 and 82)
8-bit shift registers (83 and 84)
8-bit registers (85 and 86)

Since 12-bit data [Dif] were calculated in the differential calculation circuit 22 described above, the circuit must originally execute a square calculation responsive to the corresponding number of bits. However, taking into consideration that the circuit configuration can be easily understood if the description is proposed together with the description with reference to FIG. 4 and FIG. 5, the following description is based on the assumption that the number of bits is [8] (or it may be considered that the differential calculation circuit 22 of FIG. 12 and FIG. 13 is composed of 8 bits).

First, the left side of FIG. 15 will be described. The 8-bit velocity data calculated from the differential calculation circuit 22 are supplied to the A-input terminals [A0] through [A7] of the 8-bit full adder after passing through the AND circuit 79. Also, the AND circuit 79 is composed of eight two-input AND gates, wherein respective bit signals of the velocity data are supplied to one input terminal of the respective gates and Q output signals of the D flip-flop 78 are supplied to the other input terminals.

In the D flip-flop 78, the above-described signal ck2 is supplied to the clock signal input terminal (CLK). Also, the flip-flop has an L active input preset terminal and a CLEAR terminal (in the drawings, a bar sign is attached to the respective terminal signs for illustration), wherein the preset terminals are made H-leveled. However, the above-described CLEAR signal (shown by overlying a line on [CLEAR]) is supplied to the CLEAR terminal. Further, the uppermost bit output of a shift register 84 (described later) is supplied to the D input terminal.

8-bit data, outputted by the shift register 83, are supplied to the B-input terminal [B0] through [B7] of the full adder 81, and the result of addition that is obtained from the 8-bit output terminals [Σ0] through [Σ7] of the full adder 81 is sent to the data input terminals [A] through [H] of the shift register 83. In addition, the carry-out terminal [Co] is connected to the carry-in terminal [Ci] of the full adder 82.

In the shift register 83, one [S0] of the mode control terminals [S0] and [S1] is made H-leveled, and the above-described signal [Sif] is inputted into the other [S1], wherein data load or motion to the right shift is controlled in response to whether the signal [Sif] is H-leveled or L-leveled. Also, the 8-bit data that are obtained from the output terminals [QA] through [QH] are supplied to the D input terminals [D0] through [D7] of the 8-bit register 85. Further, since [QA] is the lowermost bit among [QA] through [QH] and the digit position thereof is raised in the alphabetical order like [QB], [QC], [QD] . . . , the rightward shift operation corresponds to the leftward shift of numerical calculation (refer to FIG. 4 and the relevant description thereof) described above. Still further, when the shift registers 83 and 84 are composed of elements that are shiftable in both directions (for example, equivalent to 74HC194), it is necessary to execute a process for digit shift in the rightward shift by making serial input terminals (L and R) in the leftward shift and rightward shift in the shift register 83 L-leveled, and by connecting the uppermost terminal [QH] to the serial input terminal [R] of the rightward shift of the shift register 84 described later. The above-described CLEAR signal (shown by overlying a line on the [Clear]) is supplied to the CLEAR terminal of the shift register 83. This is the same with respect to the shift register 84 and 8-bit register 85 or 86.

The above-described signal ck3 is supplied to the clock signal input terminal (CLK) of the 8-bit register 85, and 8-bit D-input data are picked up by the output terminals [Q0] through [Q7] when the corresponding signal rises. These constitute the lower 8-bit of square value data (indicated as [Dif2]) of the velocity.

For the right side in FIG. 15, 8-bit data that are calculated by the differential calculation circuit 22 are supplied to the A input terminals [A0] through [A7] of the 8-bit full adder 82 after passing through the AND circuit 80. Also, the AND circuit 80 is composed of eight two-input AND gates, wherein respective bit signals of the velocity data are supplied to one input terminal of the respective gates, and the above-described multiplication set signal [Set] is supplied to the other input terminals.

8-bit data that are outputted from the shift register 84 are supplied to the B input terminals [B0] through [B7] of the full adder 82, and the result of addition that is obtained from the 8-bit output terminals [Σ0] through [Σ7] of the full adder 82 is sent to the data input terminals [A] through [H] of the shift register 84. Also, the carry-out terminal [Co] of the full adder 82 is not used.

In the shift register 84, the status for supplying a signal to the mode control terminals [S0] and [S1] is made the same as that in the case of the shift register 83, and the data load or rightward shift is controlled in response to H level or L level of the signal [Sif]. Also, the data that are obtained from the output terminals [QA] through [QH] are supplied to the D input terminals [D0] through [D7] of the 8-bit register 86. Further, the uppermost bit terminal [QH] is connected to the D input terminal of the D flip-flop 78. In addition, the rightward shift serial input terminal [R] is connected to the uppermost bit terminal [QH] of the shift register 83, and the leftward shift serial input terminal [L] is made L-leveled.

A signal ck3 is supplied to the clock signal input terminal (CLK) of the 8-bit register 86, and 8-bit D input data are picked up by output terminals [Q0] through [Q7] when the corresponding signal rises. The data constitute the upper 8-bit of the square value data [Dif2] of the velocity.

Therefore, the matching relationship between the component elements of the circuit and the elements described with reference to FIG. 4 and FIG. 5 are as follows:

Counter 71 <⇌>Counter [K]
Shift register 84 <⇌>B-storing register (Upper-placed register of Rbc)
Shift register 83 <⇌>C storing register (Lower-placed register of Rbc)
D flip-flop 78 <⇌>[CY-1] checking portion
Full adder 81 <⇌>Full adder [FA]

Next, a description is given of the configuration of the portion 25 for judging the status of the target value and present value, and of the integration condition determining portion 26.

Figure 16:
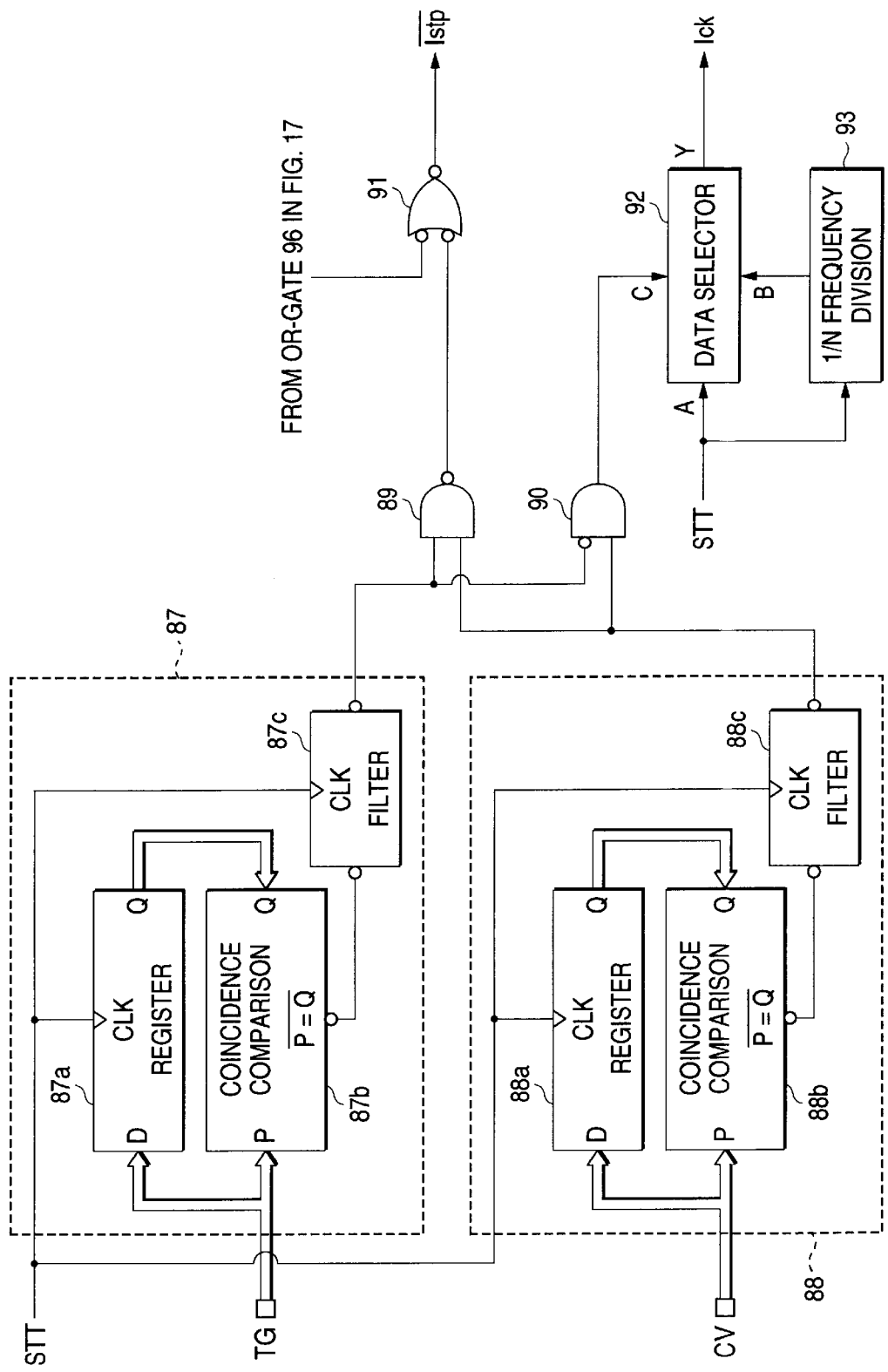
FIG. 16 is a view showing a configurational example of portions for judging status of the target value and present values.

FIG. 16 shows a configurational example of the portion 25 for judging the status of the target value and present value, which has the following circuit portions (Figures in the parentheses show reference numbers in the drawing)

Circuit (87) for detecting a per-time change in the target value

Circuit (88) for detecting a per-time change in the present value

The circuit 87, for detecting a per-time change in the target value, detects a change per unit time in the target value (for whether or not any change exists) upon receiving the 8-bit target value data TG. The circuit 87 includes an 8-bit register 87a, an identity comparator 87b, and a filter 87c. The identity comparator 87b identifies, compares and detects the coincidence with the 8-bit register 87a.

The 8-bit register 87a is composed of an 8-bit input/output D flip-flop (Octal D-type Flip-Flop), wherein the target value data are supplied to the 8-bit D input. Also, the above-described calculation commencement signal (STT) is supplied to the clock signal input terminal (CLK), and the 8-bit Q output is sent to the comparator 87b as the 8-bit Q input.

The target value data TG is supplied to the 8-bit P input of the comparator 87b (for example, equivalent to 74HC688). Also, a coincidence detection signal, which becomes L-leveled when the respective bits of the P input are equal to the respective bits of Q input, is obtained from the output terminal (in the drawing, indicated by overlying a line on the [P=Q]). This signal is sent to the filter 87c.

For example, a D flip-flop is used for the filter 87c, wherein the calculation commencement signal (STT) is supplied to the clock signal input terminal (CLK), and a coincidence detection signal from the comparator 87b is inputted into the D input terminal. Also, the Q output signal is made H-leveled when detecting a per-time change in the target value, and the corresponding signal is supplied to one input terminal of the 2-input NAND (negation logic product) gate 89, and to one input terminal (L active input terminal) of the 2-input NAND gate 90.

The circuit 88, for detecting a per-time change in the present value, detects a change per time in the present value upon receiving the 8-bit present value data CV. As in the above-described circuit 87 for detecting a per-time change in the target value, the circuit 88 detects a per-time change upon receiving the 8-bit present value data [CV], and is provided with an 8-bit register 88a, an identity comparator 88b (identity comparator) for comparing and detecting the coincidence, and a filter 88c.

That is, the 8-bit register 88a is composed of a D flip-flop (Octal D-type Flip-Flop), and the present value data CV is supplied to the 8-bit D input terminal. Also, the above-described calculation commencement signal (STT) is supplied to the clock signal input terminal (CLK), and the 8-bit Q output is sent to the comparator 88b as an 8-bit Q input.

The present value data is supplied to the 8-bit P input of the comparator 88b (for example, equivalent to 74HC688), and a coincidence detection signal that becomes L-leveled is obtained from the output terminal when the respective bits of the P input are equal to the respective bits of the Q input (in the drawing, indicated by overlying a line on [P=Q]). This signal is sent to the filter 88c.

A D flip-flop is used for the filter 88c, wherein a calculation commencement signal (STT) is supplied to the clock signal input terminal (CLK), and a coincidence detection signal from the comparator 88b is inputted into the D input terminal. The Q output signal becomes H-leveled when any change per time in the present value is recognized, and the corresponding signal is supplied to one input terminal of the 2-input NAND gate 89, and to the 2-input AND gate 90.

The output signal of the NAND gate 89 is supplied to one input terminal of the L active 2-input and L active 1-output OR gate 91 (an output signal of the OR gate 96, described later, is inputted into the input terminal at the other side of the OR gate 91). Also, the output signal of the AND gate 90 is supplied to the control terminal [C] of a data selector 92.

An input signal to the data selector 92 is a frequency-dividing signal made after making the calculation commencement signal (STT) and the corresponding signal pass through a frequency-dividing circuit 93. The former signal is supplied to the input terminal [A], and the latter signal is supplied to the input terminal [B]. The data selector 92 outputs an input signal (that is a frequency-dividing signal of STT) for the terminal [B] from the output terminal thereof when the signal level of the control terminal [C] is H-leveled. On the other hand, the data selector 92 outputs an input signal (that is, STT) for the terminal [A] from the output terminal when the signal level of the control terminal [C] is L-leveled. Thus, the output signal from the output terminal [Y] may be used as an integration clock signal (This is referred to as [Ick]).

Figure 17:
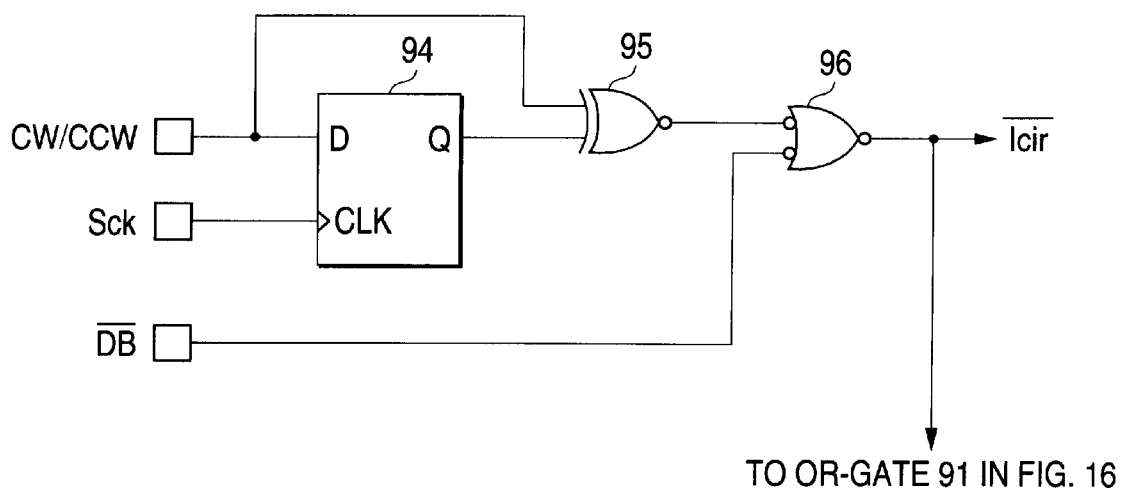
FIG. 17 is a view showing a configurational example of an integration condition determining portion.

As shown in FIG. 17, in the integration condition determining portion 26, a signal CW/CCW—(Refer to FIG. 11) pertaining to the rotation direction of the above-described motor—is supplied to the D input terminal of the D flip-flop 94 and, at the same time, is supplied to one input terminal of the 2-input exclusive logic sum gate 95.

A clock signal [Sck] is supplied to the clock signal input terminal (CLK) of the D flip-flop 94 after an appointed period of time elapses from the commencement of calculation, whereas the Q output signal is supplied to the remaining input terminals of the exclusive logic sum gate 95. Also, the clock signal Sck is generated in the PWM frequency determining portion 31 as described later, is the logic product signal of the clock output signal and calculation commencement signal (STT), and is supplied to the clock signal input terminal (CLK) of the D flip-flop 94.

A signal that is obtained from the L active output terminal of the exclusive logic sum gate 95 is sent to one input terminal of the L active 2-input and L active 1-output OR gate 96, and the above-described dead band judging signal DB (indicated by attaching a bar) is supplied to the other input terminal. The output signal of the OR gate 96 is utilized as an integration CLEAR signal (indicated by overlying a line on [Iclr] in the drawing).

The output signal of the OR gate 96 is also supplied to the input terminal of the OR gate 91 in FIG. 16. Herein, a logic sum calculation is carried out between the output signal and the output signal of the above-described NAND gate 89. The output signal of the OR gate 91 may be used as an integration pause signal (indicated by overlying a line on [Istp] in the drawing).

Therefore, in this construction, where both output signals from the circuit 87 for detecting a per-time change in the target value and from the circuit 88 for detecting a per-time change in the present value are L-leveled, the output signal of the AND gate 90 becomes L-leveled, and the signal STT is selected as an integration clock in the data selector 92. Also, where both output signals from the circuit 87 for detecting a pertime change in the target value and from the circuit 88 for detecting a per-time change in the present value are H-leveled, the output signal of the NAND gate 89 becomes L-leveled. Therefore, the signal Istp becomes L-leveled, wherein an integration pause instruction is generated. Further, where the output signal of the circuit 87 for detecting a per-time change is L-leveled and the output signal of the circuit 88 for detecting a pertime change is H-leveled, the output signal of the AND gate 90 becomes H-leveled. Therefore, the frequency dividing signal of the signal STT is selected as an integration clock in the data selector 92.

The integration CLEAR signal Iclr becomes L-leveled where non-coincidence in level between the signal CW/CCW and the Q output signal of the D flip-flop 94 is detected, or when the signal DB is L-leveled (that is, when the error enters the dead band). Also, the D flip-flop 94 and exclusive logic sum gate 95 judge whether or not the present position of the motor goes beyond the target value. That is, if integration is continued when the present position exceeds the target value, the value of integration will become a very large value with respect to a slight amount of error, wherein there is a risk that oscillation may occur. Therefore, where the present position exceeds the target value, the amount of integration is cleared to be zero.

Figure 18:
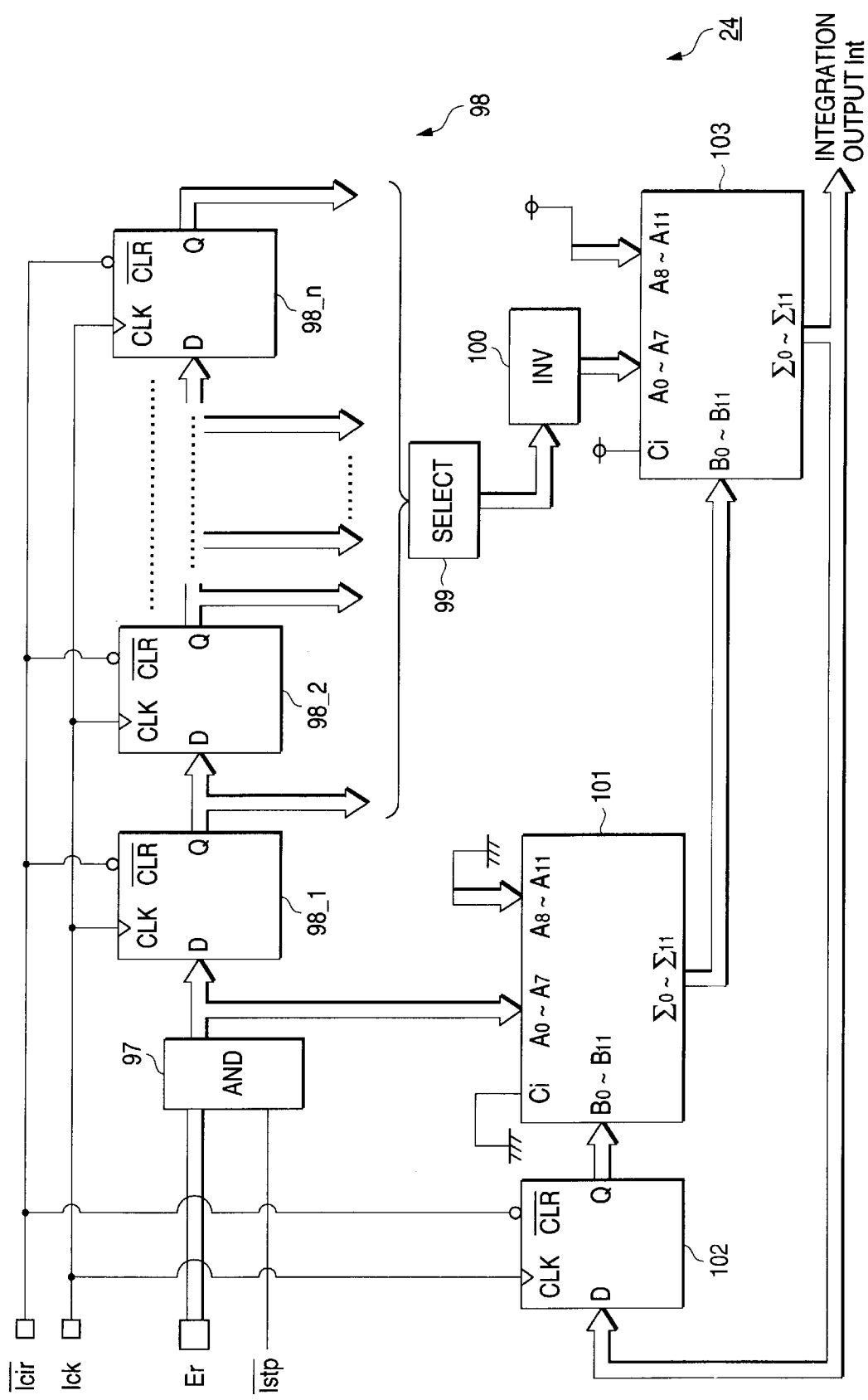
FIG. 18 is a view showing a configurational example of an integration calculation portion.

FIG. 18 shows a configurational example of the integration calculation portion 24.

First, the present error data [Er] is supplied to the AND circuit 97. The circuit is composed of eight 2-input AND gates (for example, equivalent to 74HC08). Respective bit signals of the error data are inputted into one input terminal of the respective gates, and the above-described integration pause signal Istp (indicated by overlying a line in the drawing) is supplied to the other input terminals.

The delay processing portion 98 is constructed so that "n" 8-bit registers 98_1, 98_2, . . . 98_n are longitudinally connected to each other. An 8-bit input/output D flip-flop (Octal D-type Flip-flop) equipped with a CLEAR terminal is used in the respective registers. Also, an integration clock [Ick] is supplied to the clock signal input terminals (CLK) of the respective D flip-flops 98_1, 98_2, 98_n and an integration CLEAR signal Iclr is supplied to the respective CLEAR terminals thereof. Further, as for the connection of the respective D flip-flops, 8-bit Q output data of the flip-flops of the former stage are sent one after another as an 8-bit D input of the flip-flops positioned in the next stages.

Moreover, 8-bit Q output data of the respective D flip-flops are also sent to the data selector 99, wherein only one Q output data (8-bit data) selected herein is sent to a bit inverting circuit 100. For example, where it is assumed that the number n of the D flip-flops is 14, it is possible to obtain previous error data equivalent to one time through 14 times of the time unit (the time regulated by the frequency of the integration clock) from the present error data. One of them, for example, the 8-bit Q output from the D flip-flop positioned in the final stage, is selected, and it can be sent to the bit inverting circuit 100. That is, since the data selector 99 can be used to set the integration time (for example, may be used to set the integration time in response to the running states of a vehicle and differences in vehicle types to which the data selector is applied), the data selector is no longer required where it is not necessary to change the setting since the setting time is predetermined—because D flip-flops of the number by which delay time corresponding to the setting time can be obtained are longitudinally connected to each other, and 8-bit Q output of the flip-flop positioned in the final stage may be supplied to the bit inverting circuit 100. 8-bit data that are outputted by the AND circuit 97 are supplied to D input of the register 98_1 (D flip-flop) in the first stage, which constitutes the delay processing portion 98, and, at the same time, are supplied to input terminals [A0] through [A7] of the lower 8-bit among A input terminals [A0] through [A11] of a 12-bit full adder 101. Also, all the input terminals [A8] through [A11] of the upper 4-bit are made L-leveled.

Output data are supplied from the 12-bit register 102 to the B input terminals [B0] through [B11] of the full adder 101, wherein the result of calculation is sent from the 12-bit output terminals [Σ0] through [Σ11] to the B input terminals

[B0] through [B11] of the 12-bit full adder 103 of the next stage. Also, the carry-in terminal [Ci] of the full adder 101 is L-leveled.

8-bit data from the above-described bit inverting circuit 100 are inputted into the input terminals [A0] through [A7] of the lower 8 bits among the A input terminals [A0] through [A11] of the full adder 103.

Integration data (this is called "[Int]") are obtained from the 12-bit output terminals [Σ0] through [Σ11] of the full adder 103, and the corresponding data are sent to (D input terminals of) the 12-bit register 102. Further, the carry-in terminal [Ci] of the full adder 103 is made H-leveled.

Thus, in the full adder 103, it is guaranteed that by subtracting the past error data selected from the delay processing portion 98 from the output data of the full adder 101 of the former stage, an error calculation is carried out in an appointed integration time.

A D flip-flop with a CLEAR terminal is used for the 12-bit register 102, wherein an integration clock Ick is supplied to the clock signal input terminal (CLK), and an integration CLEAR signal Iclr is supplied to the CLEAR terminal. Subsequently, the above integration data Int is inputted to the 12-bit D input terminal, and 12-bit Q output data are supplied to the B input terminals [B0] through [B11] of the full adder 101.

Thus, when the integration pause signal Istp is H-leveled in the circuit, integration is carried out on the basis of the integration clock Ick. That is, the operating frequency of the integration is regulated by the clock Ick. However, when the signal Istp is L-leveled, the output signal of the AND circuit 97 is regulated to be zero (all L-leveled).

Figure 19:
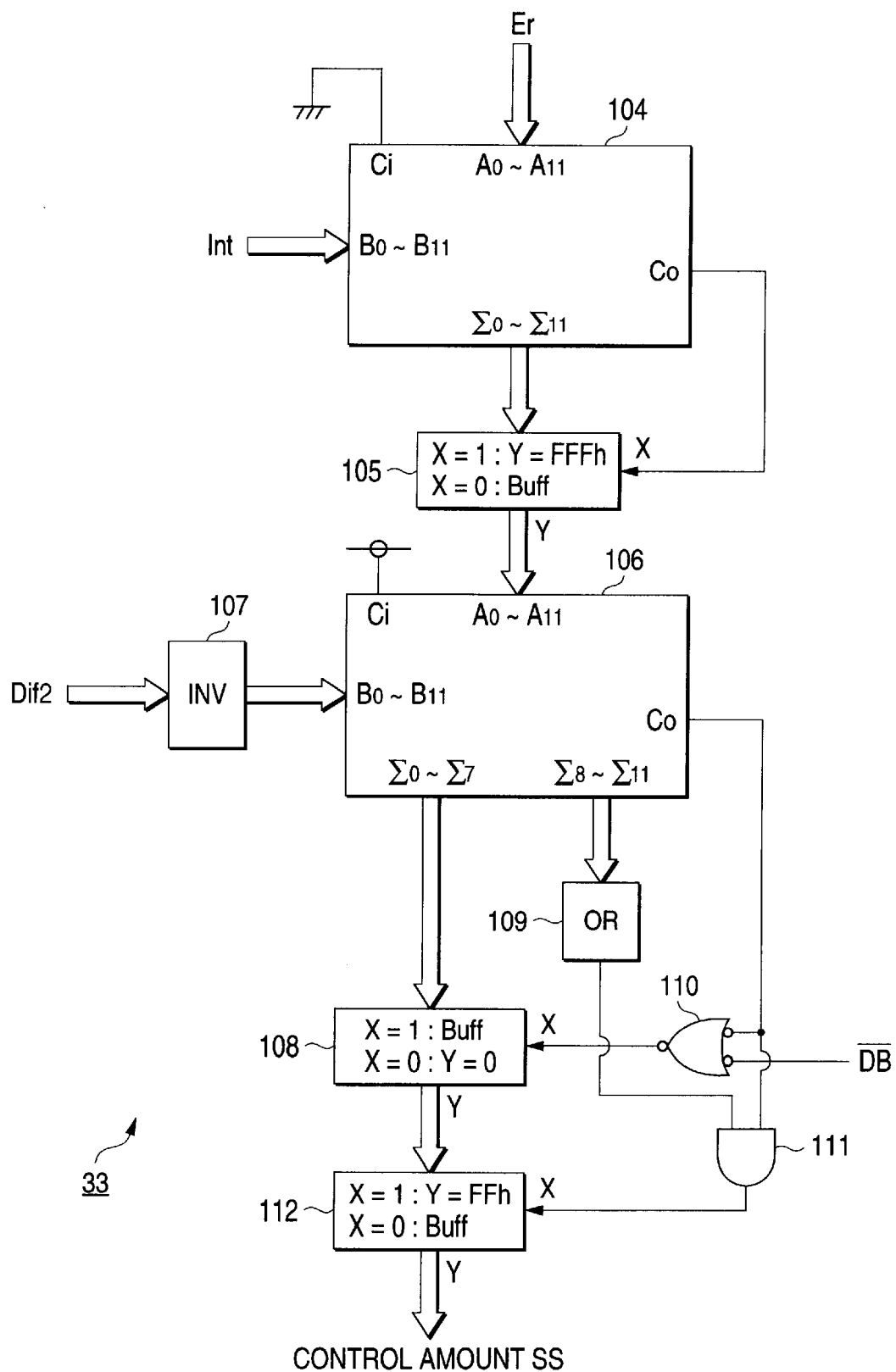
FIG. 19 is a view showing a configurational example of a PID control amount calculation portion.

FIG. 19 shows a configurational example of the PID control amount calculation portion 33.

Error data Er are supplied to, for example, the input terminals [A0] through [A8] of the lower 8 bits among the A input terminals [A0] through [A11] of the 12-bit full adder 104, and integration data Int are supplied to the B-input terminal [B0] through [B 11]. Data that are obtained from the output terminals [Σ0] through [Σ11] are sent to the logic circuit 105, and the output signal of the carry-out terminal [Co] is supplied to the control terminal [X] of the logic circuit 105. Further, the carry-in terminal [Ci] is made L-leveled.

In the logic circuit 105, hexadecimal [FFFh], that is, data that make all the bits valid, are outputted from the output terminal [Y] when the signal level to the control terminal [X] is H-leveled (X=1). On the other hand, the input data are obtained at the output terminal [Y] as they are when the signal level to the control terminal [X] is L-leveled, i.e., to function as a buffer [Buff]. Also, the circuit is composed of, for example, twelve 2-input OR gates, wherein respective bit signals of the output signal of the full adder 104 are supplied to one input terminal of the respective gates, and to output signal of the carry-out terminal [Co] is supplied to the other input terminals.

The output signal of the logic circuit 105 is supplied to the A input terminals [A0] through [A11] of a 12-bit full adder 106, and differential data [Dif2]—that is, those square-calculated as 12-bit data, obtained after a square calculation is completed—are supplied, via the bit inverting circuit 107, to the B input terminals [B0] through [B11 ] of the corresponding full adder.

The lower 8-bit data (terminals [Σ0] through [Σ7]) of the 12-bit output terminals [Σ0] through [ Σ11] of the full adder 106 are sent to the logic circuit 108, and the upper 4-bit data ([Σ8] through [Σ11]) are sent to an OR circuit 109. Also, the output signal of the carry-out terminal [Co] of the full adder 106 is sent to an L active 2-input/1-output OR gate 110, and to a 2-input AND gate 111. Further, the carry-in terminal [Ci] is made H-leveled.

The above-described signal [DB] (indicated by attaching a bar) is inputted into the OR gate 110, and the output signal is supplied to the control terminal [X] of the logic circuit 108.

The logic circuit 108 is constructed so that it outputs the input data from the output terminal [Y] as it is (that is, it functions as a buffer [Buff]) when the signal level to the control terminal [X] is H-leveled. On the other hand, the logic circuit 108 outputs zero from the output terminal [Y] (that is, Y=0) when the signal level to the control terminal [X] is L-leveled. The circuit 108 is composed of eight 2-input AND gates, wherein respective bit signals of the output data of the full adder 106 are supplied to one input terminal of the respective gates, and an output signal of the OR gate 110 is supplied to the other input terminals.

The OR gate 109 obtains a logic sum signal with respect to the output terminals [Σ8] through [Σ11] of the full adder 106, and sends it to a 2-input AND gate 111.

The output data of the logic circuit 108 are further sent to a logic circuit 112. The construction of this logic circuit 112 is almost the same as that of the above-described logic circuit 105. However, the output signal of the above-described AND gate 111 is supplied to the control terminal [X] of the logic circuit 102, wherein if [X=1], a hexadecimal [FFh] is outputted from the terminal [Y].

8-bit data obtained from the output terminal [Y] of the logic circuit 112 corresponds to the control amount SS. Also, as has been made clear from the above description, the control amount SS may be obtained from weighting addition (that is, obtained by calculating the control amount from [Er+(b/a)·Int+(c/a)·Dif2=SS] or [a·Er+b·Int+c·Dif2=SS] where [a≠0] after predetermining weighting coefficients a, b and c on the basis of the results of experiments and simulations) with respect to error data Er, integration data Int, and differential data Dif2. However, it is preferable, in view of preventing the circuit configuration from increasing in scale, that the weighting for a weighting process is carried out based on only setting of the bit shaft ($n^{th}$ power time of 2 or $n^{th}$ power of 2). That is, in a method for optionally setting a weighting coefficient by using an adder or a multiplier, the number of circuit elements is obliged to increase.

Figure 20:
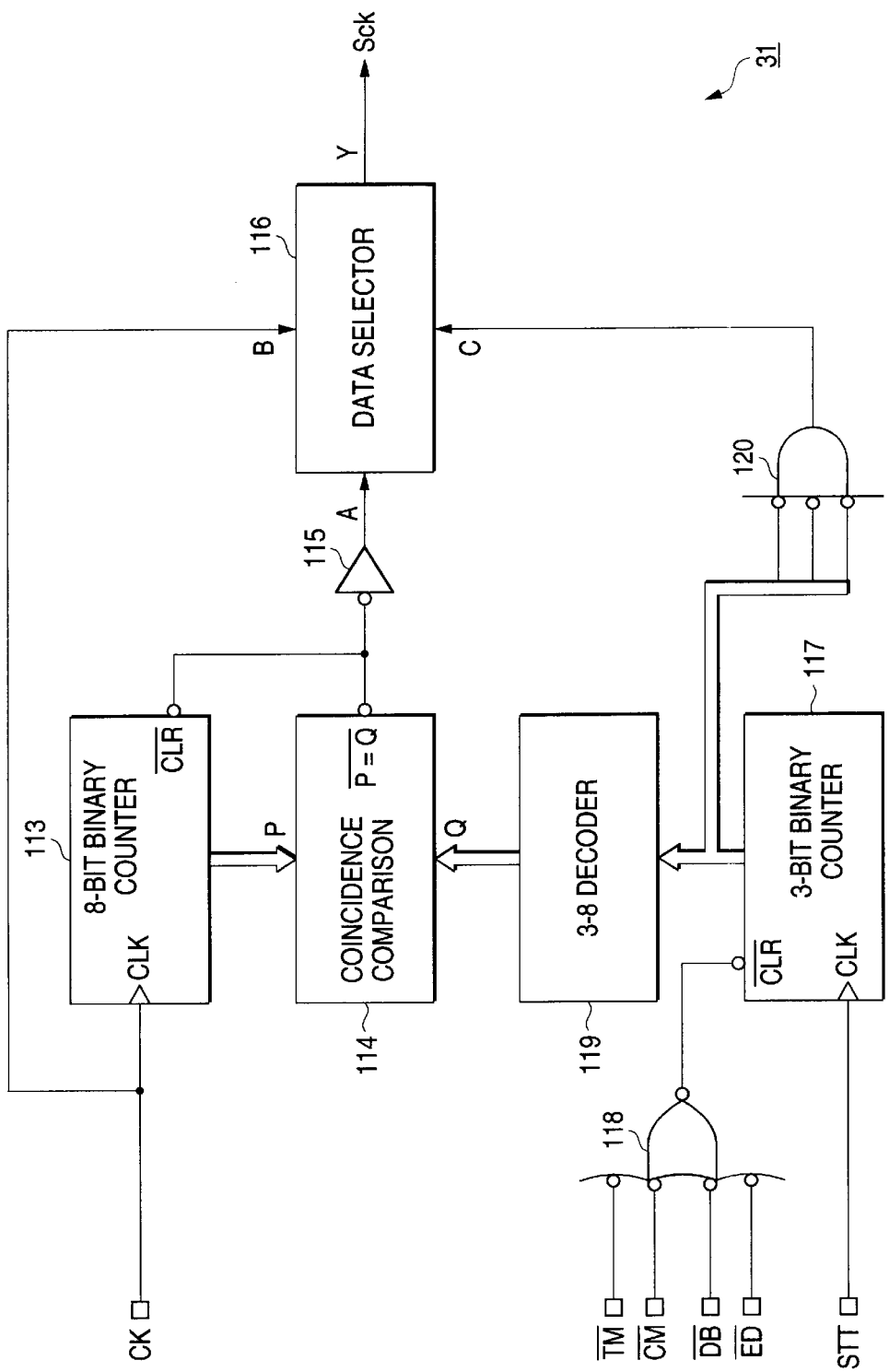
FIG. 20 is a view showing a configurational example of a PWM frequency determining portion.

FIG. 20 shows a configurational example of the PWM frequency determining portion 31.

The output signal [CK], of the above-described oscillator 30, is supplied to the clock signal input terminal (CLK) of a 8-bit binary counter 113, and is simultaneously supplied to the input terminal [B] of a data selector 116.

8-bit output of the 8-bit binary counter 113 is sent to the P-input terminal of a comparator 114 for comparing and detecting coincidence (i.e., Identity Comparator).

A 3-bit binary counter 117 counts a calculation commencement signal STT provided to the clock signal input terminal (CLK) and sends the count output to a 3-8 decoder 119. Also, the following signals are supplied to the CLEAR terminal of the counter 117 via an L active 4-input and 1-out OR gate 118.

[TM]= signal showing whether or not a per-time change in the target value is detected.

[CM]= signal showing whether or not a per-time change in the present value is detected.

[DB]= signal showing whether or not an error enters the dead band as described above.

[ED]= signal showing whether or not the sign of the error has changed.

Further, as shown in the drawings, by attaching a bar on the respective signals, when the signal is L-leveled, a positive detection result can be obtained. At this time, the 3-bit binary counter 117 is cleared. Also, it is possible to obtain the [TM] and [CM] on the basis of the output from the circuits 87 and 88 for detecting a per-time change (See FIG. 16), and it is possible to obtain the [ED] from the sign bit of the error data Er.

The output signal of the 3-bit binary counter 117 is sent to an L active 3-input NAND gate 120, and the output signal of the corresponding gate is sent to the control terminal [C] of a data selector 116. In addition, a signal showing whether or not the control amount SS exists is supplied to an ENABLE terminal (not shown) of the 3-bit binary counter 117. Where the control amount SS is not zero, the corresponding counter can function.

The 3-8 decoder 119 sends 8-bit data (which makes only a certain bit [1]) corresponding to the 3-bit signal to the Q input terminal of the above-described comparator 114.

In the comparator 114, an output signal (indicated by overlying a line on [P=Q]) that becomes L-leveled is obtained when coincidence is detected with respect to the respective data of the P input terminal and Q input terminal, and the corresponding signal is supplied to the CLEAR terminal (indicated by attaching a bar onto [CLR]) of the 8-bit binary counter 113, and is simultaneously sent to the input terminal [A] of the data selector 116 via an L active input NOT gate 115.

The data selector 116 is constructed so that it selects a signal of the input terminal [B] when the signal level to the control terminal [C] is H-leveled and picks it up at the output terminal [Y] (Y=B). On the other hand, the data selector 116 selects a signal of the input terminal [A] when the signal level to the control terminal [C] is L-leveled and picks it up at the output terminal [Y]. The signal selected herein is a clock signal [Sck].

Therefore, in this circuit, the signal CK is counted by the 8-bit binary counter 113, and, in the comparator 114, the counted data and the setting data given via the 3-8 decoder from the 3-bit binary counter 117 are compared with each other. When the output of the 3-bit binary counter 119 is zero, the clock signal [CK] is selected, and when the output of the counter 119 is not zero, a signal having a pulse width regulated by the above-described setting data is selected.

In FIG. 8 and FIG. 10, for the convenience of description, a clock signal [CK] brought about by the oscillator 30 is used to describe the operation (that is, it is assumed that the clock frequency is constant). In fact, the signal [Sck] regulates the PWM frequency. For example, in FIG. 9, there is no problem if the signal [CK] is replaced by a signal [Sck].

In addition, since the portion 32 merely provides signals necessary for the operation of the respective circuit portions, such as sending the signal [Sck] to the PWM calculation portion 34 and to the integration condition determining portion 26, the description and illustration thereof are omitted here.

Figure 21:
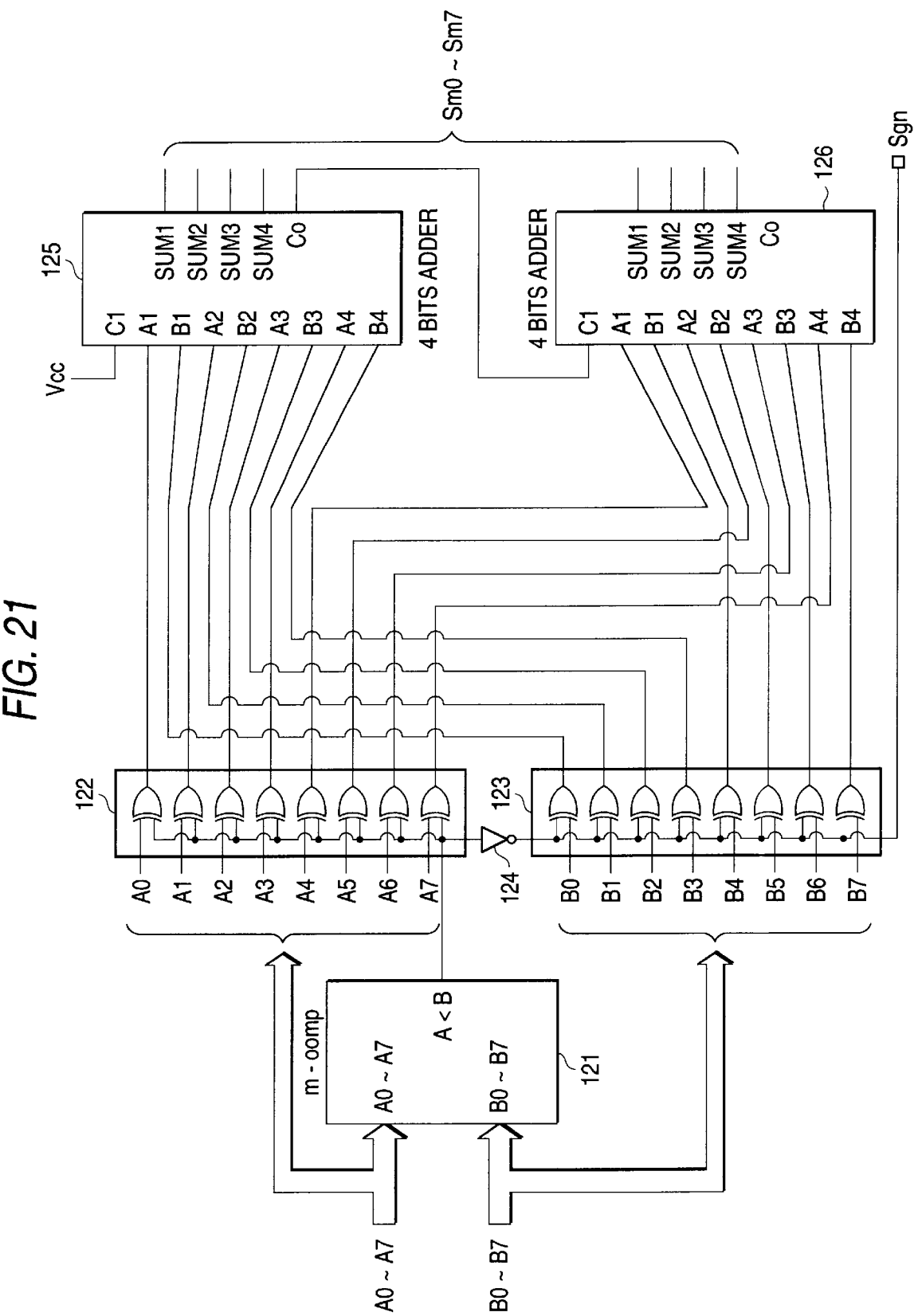
FIG. 21 is a view showing a configurational example of circuits of a digital subtraction process.

If such a construction (see the full adders 48, 53, and logic circuit 51 and NOT gate 52) shown in, for example, FIG. 11 is employed with respect to a subtraction process [A−B] of the digital amounts [A] and [B], an adder will be required at an addition portion using a complement of 2 and a conversion portion from a complement to an antilog, respectively, wherein, since the efficiency of use of the gates is not satisfactory, it is preferable to employ the construction shown in FIG. 21 in order to improve the efficiency. That is, 8-bit data [A0] through [A7] are supplied to one 8-bit input terminal of a magnitude comparator (m-comp) 121, and also are respectively supplied to inputs terminal of eight Ex-OR gates that constitute an exclusive logic sum circuit 122. Also, 8-bit data [B0] through [B7] are supplied to the other 8-bit input terminal of the magnitude comparator 121, and also are respectively supplied to input terminals of eight Ex-OR gates that constitute an exclusive logic sum circuit 123. The magnitude comparator 121 compares the respective input data with respect to their sizes, wherein, if [A]<[B], a signal that becomes H-leveled is outputted. The output signal is supplied into the respective remaining input terminals of the exclusive logic sum circuit 122, and the corresponding output signal is logically negated through a NOT gate 124 whereby it is supplied into the respective remaining input terminals of the exclusive logic sum circuit 123.

Output signals of respective gates that receive bit inputs of [A0] through [A3] of the EX-OR gates, which constitute the exclusive logic sum circuit 122, are sent to a 4-bit full adder 125 in a subsequent stage. That is, the output signal of the Ex-OR gate that receives a bit input of $A_i$(i=0,1,2,3) is supplied to an input terminal $[A_{i-1}]$ of the full adder 125.

Also, output signals of respective gates that receive bit inputs of [B0] through [B3] of the EX-OR gates, which constitute the exclusive logic sum circuit 123, are sent to a 4-bit full adder 125. That is, the output signal of the Ex-OR gate that receives a bit input of $B_i$(i=0,1,2,3) is supplied to an input terminal $[B_{i+1}]$ of the full adder 125.

Also, in the full adder 125, a terminal [Ci] to which a voltage VCC is supplied is a carry-in terminal, whereas [Co] is a carry-out terminal. Also, [SUM 1 through 4] are 4-bit output terminals showing the result of addition.

Output signals of respective gates that receive bit inputs of [A4] through [A7] of the Ex-OR gates, which constitute the exclusive logic sum circuit 122, are sent to a 4-bit full adder 126. That is, the output signal of the Ex-OR gate that receives a bit input of $A_i$(i=4,5,6,7) is supplied to an input terminal $[A_{i-3}]$ of the full adder 126.

Also, output signals of respective gates that receive bit inputs of [B4] through [B7] of the EX-OR gates, which constitute the exclusive logic sum circuit 123, are sent to a 4-bit full adder 126. That is, the output signal of the Ex-OR gate that receives a bit input of $B_i$(i=4,5,6,7) is supplied to an input terminal $[B_{i-3}]$ of the full adder 126.

In addition, the full adder 126 is devised so that a signal from the carry-out terminal [Co] of the full adder 125 is supplied to the carry-in terminal [Ci] of the full adder 126, and [SUM 1 through 4] are 4-bit output terminals showing the result of addition.

Therefore, in this circuit, when executing a digital subtraction [A−B], the magnitude comparator 121 compares [A] with [B] with respect to the size in advance. As a result, the larger one is inputted into the full adders 125 and 126 as it is, and the smaller one is inputted into the full adders after removing a complement of 1. For example, if [A]<[B], since the magnitude comparator 121 outputs an H-leveled signal, wherein with [A], the bit is supplied to the full adders after inverting the bit by the exclusive logic sum calculation with the corresponding signal, and wherein with [B], the bit is supplied to the full adder without any change by the exclusive logic sum calculation with the L-leveled signal that is outputted from the NOT gate 124. Therefore, in this case, outputs of the additions made by the full adders 125 and 126 are collected as one to produce 8-bit data (See [Sm0 through Sm7] in the drawing). The 8-bit data is the result of subtraction [B]−[A], and the signal that is obtained, as a sign bit (See [Sgn] in the drawing), from the NOT gate 124 is L-leveled. This means a negative value.

The result of subtraction, which is obtained by the full adder, always becomes a positive value, and positive and negative values can be obtained by a sign bit. Adders can be collected at one position, wherein it is not necessary to provide any adder for converting a complement of 2 to an antilog.

Figure 22:
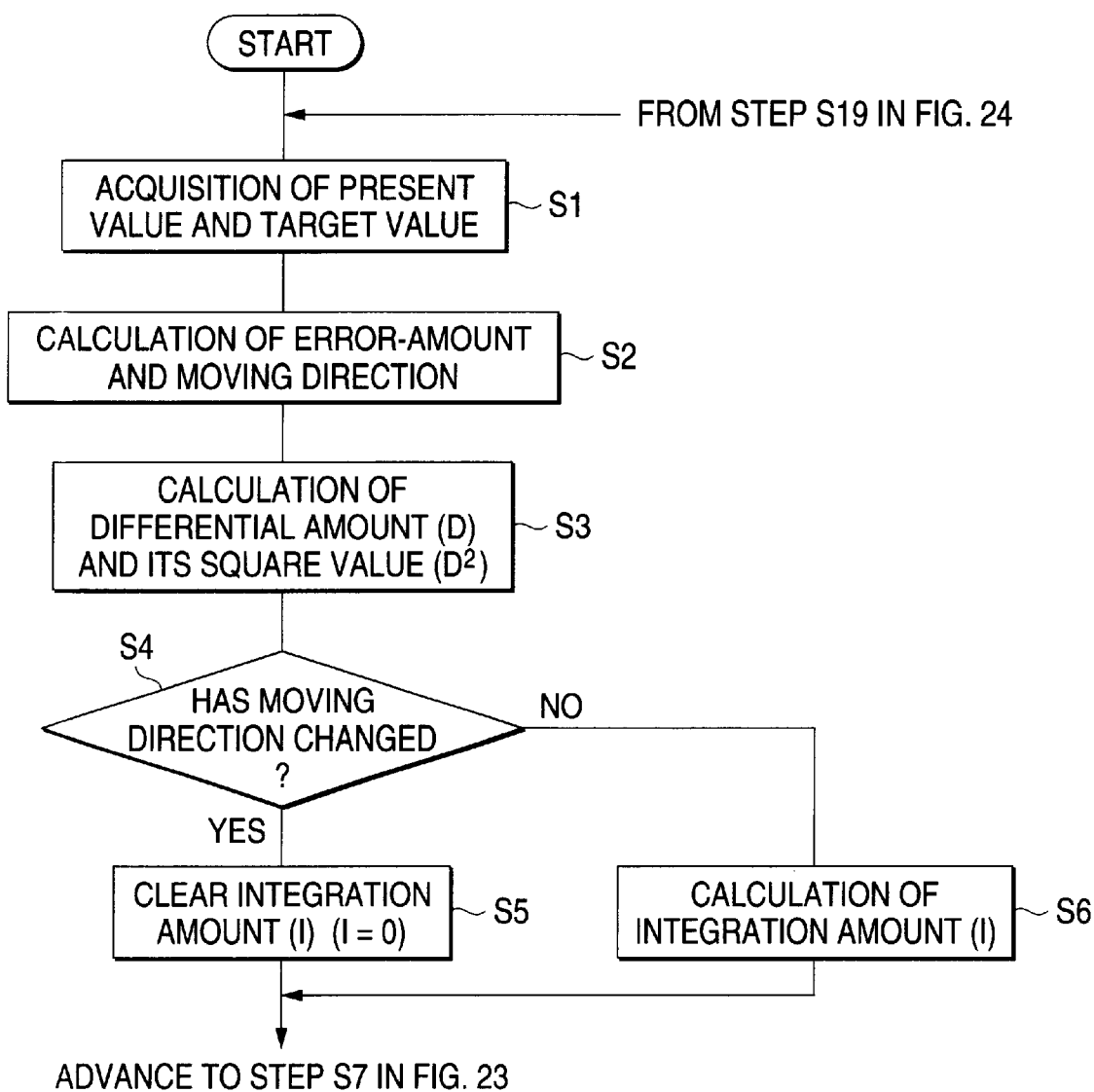
Figure 23:
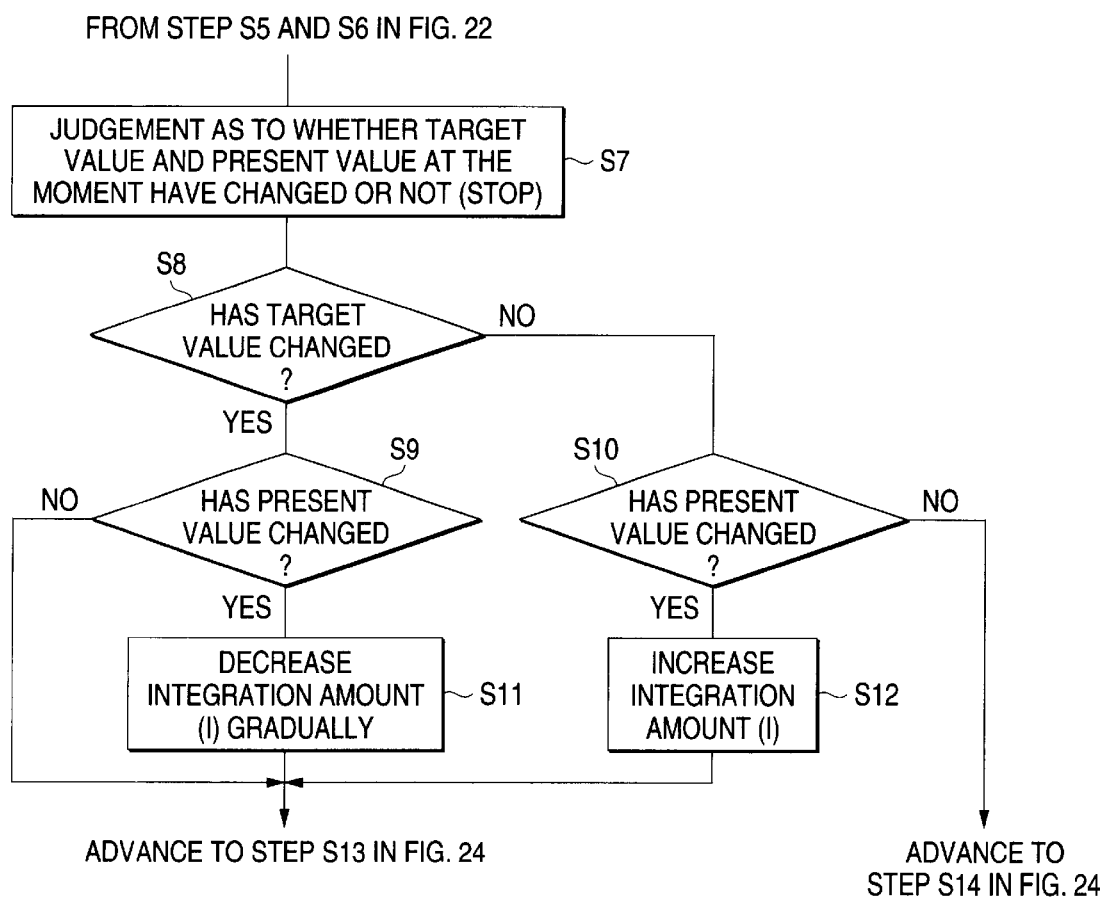
FIG. 23 shows the intermediate portion of the process.
Figure 24:
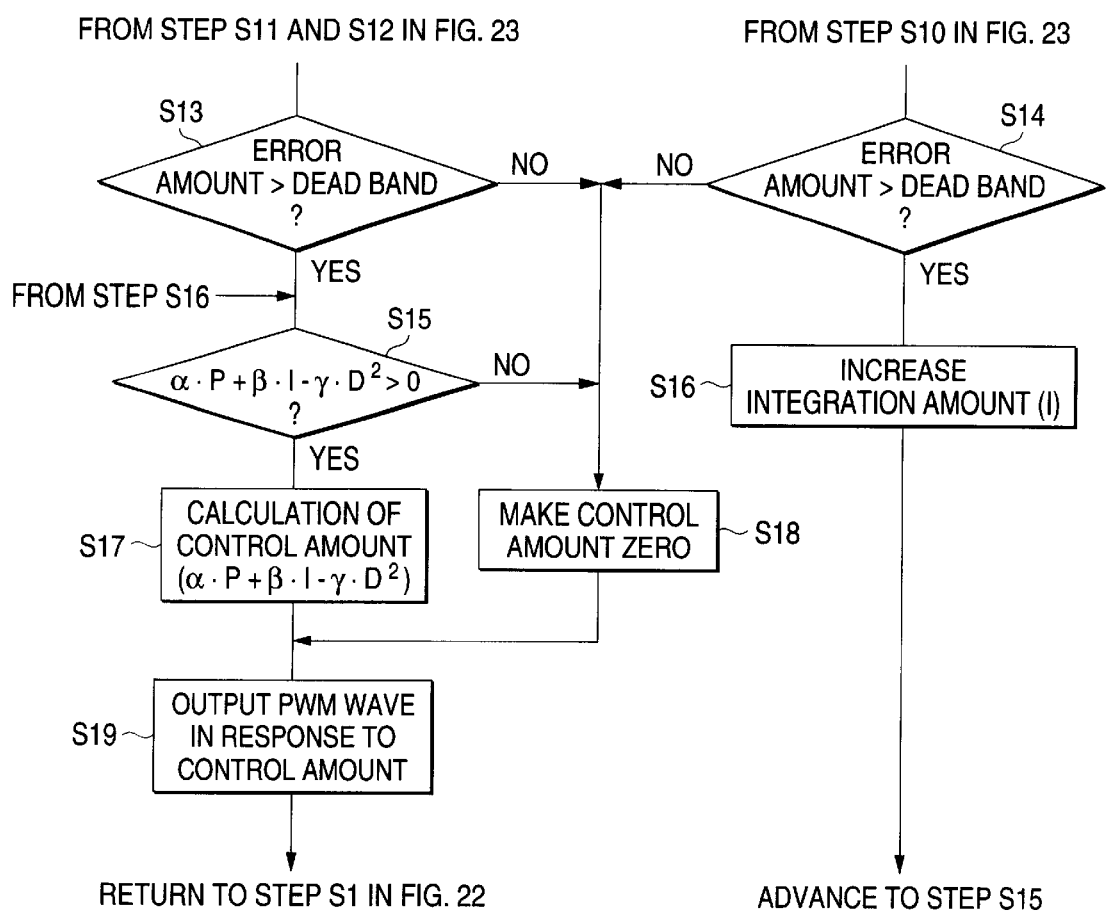
FIG. 24 shows the ending portion of the process.

Finally, a brief description is given of one example of the control procedures, by which the motor is driven and controlled by a microcomputer, with respect to the operations of the circuits described above and with reference to flow charts shown in FIG. 22 through FIG. 24.

First, the present value and target value of the motor position are acquired in Step S1, see FIG. 22. Then, the size (=|Target value−Present value|) of the amount of error, and moving direction (or sign of the amount of error), are calculated in step S2.

In step S3, the differential amount (D) is calculated, and the square value [D^2] is calculated. Also, the differential calculation may be executed by using a difference formula shown in the above-described expression (5). However, in a simpler way, it may be calculated from [(Sampling value of "N" times before−Present value)/(N·Sampling cycle)].

Judgment is made in Step S4 as to whether or not the moving direction has changed. If a change is recognized, the process advances to Step S5, wherein the amount of integration (I) is cleared to zero. On the other hand, if no change is recognized, the process advances to Step 6, wherein the amount of integration (I) is calculated. That is, the present amount of error is added to the total sum of the amount of error until "N" times before, and this is regarded as a new amount of integration.

After Steps S5 and S6, the process advances to Step S7, wherein judgment is made as to whether or not any motion is recognized with respect to the target value and present value at this moment, or whether or not they remain unchanged. In the next step S8, judgment is made as to whether or not the target value has changed. If a change is recognized, the process advances to step S9, but if no change is recognized, the process advances to step S10.

In step S9, judgment is made as to whether or not a change is recognized in the present value. If a change is recognized, the process advances to Step S11, wherein the amount of integration (I) is controlled to gradually decrease, and the process advances to Step S13 in FIG. 24. Where the present value does not change, the process advances straight to step S13 in FIG. 24.

Similarly, in step S10, it is judged whether or not a change is recognized in the present value. If a change is recognized, the process advances to Step S12, wherein the amount of integration (I) is controlled to gradually increase, and the process advances to Step S13 in FIG. 24. Where the present value does not change, the process advances straight to step S14 in FIG. 24.

In step S13, see FIG. 24, judgment is made as to whether or not the size of the amount of error exceeds the scope of the dead band. If so, the process advances to step S15. However, if the size of the amount of error is within the scope of the dead band, the process advances to step S18.

Further, in step S14, judgment is made as to whether or not the size of the amount of error exceeds the scope of the dead band. If so, the process advances to step S16. But, if the size of the amount of error is within the scope of the dead band, the process advances to step S18.

In Step S15, judgment is made as to whether or not the control amount (=$\alpha \cdot P + \beta \cdot I - \gamma \cdot D^2$), which is obtained by executing a weighting sum calculation in which the amount of error [P], amount of integration [I], and square value [D^2] are multiplied by constant coefficients [$\alpha$], [$\beta$], and [$-\gamma$], is a positive value. If the control amount is positive, the process advances to step S17, and the corresponding control amount is employed as it is, and the process advances to step S19. But if the control amount is not positive, the process advances to step S18.

In step S16, the amount of integration (I) is increased. That is, in order to increase the ON-duty of the PWM wave, the frequency is not changed, but the amount of integration is increased by an appointed amount (=[Number of times of loops×N (Number of times of sampling)×a fixed amount]) per control loop. Then, the process advances to step S15.

In step S18, the process advances to step S19 after setting the amount of control to zero.

In step S19, the PWM wave is generated in compliance with the control amount, and is outputted to the motor driver, whereby the motor is driven and controlled. Then, the process returns to step S1 in FIG. 22.

As has been made clear from the above description, according to a first aspect of the invention, it is possible to guarantee smooth rotational control of a motor, which is a drive source for adjusting an optical axis. Also, according to the first aspect, it is possible to accurately repeat a stop position of the motor by way of PID control and PWM control, thereby reducing the switching loss and suppressing an increase in cost.

According to a second aspect of the invention, a dead band of a fixed width is set centered around the point where the error is zero, and the control amount is set to zero when the error is within the scope of the dead band, whereby the brush of the motor is prevented from wearing, and oscillation is prevented.

According to a third aspect of the invention, a differential amount (velocity) is calculated with respect to three points of the present position of the motor, the past position thereof one time unit before the present position, and the past position thereof two time units before that, whereby sufficient accuracy necessary to control the direction of the optical axis can be guaranteed, and the circuit configuration can be prevented from becoming complicated.

According to a fourth aspect of the invention, a square value is calculated after the first-order derivative calculation per time is completed. The square value is sent to the PID calculation processing portion, wherein it is possible to reduce a difference in the transition characteristics due to fluctuations in the power source voltage and load. Thus, it becomes possible to further improve the transition characteristics in comparison with the case of the first-order derivative amount.

According to a fifth aspect of the invention, if the amount of error that is added as an amount of integration is set to zero when changes are recognized in both the target value and present value, taking influences due to inertia into consideration, it is possible to reduce the amount of control further than when the motor commences operation.

According to a sixth aspect of the invention, the operating frequency of integration is controlled to become lower in the case where a change is recognized in only the present value of position control than in the case where a change is recognized in only the target value, wherein it is possible to prevent overshooting and to guarantee control approaching the target value.

According to a seventh aspect of the invention, where changes in the target value and present value, with respect to the position control, are reduced or no change is recognized therein, the frequency of the PWM waves is gradually lowered in line with the elapse of time, whereby accurate positioning (stop control) can be achieved.

The present invention is not limited to the specific above-described embodiments. It is contemplated that numerous modifications may be made to the motor-controlling circuit of the present invention without departing from the spirit and scope of the invention as defined in the following claims.

What is claimed is:

1. A motor-controlling circuit, for an optical-axis-adjusting unit of a vehicle illuminating device, having a direct current motor as a drive source for adjusting the optical axis and a position detecting portion thereof, which carries out feedback control so that an error value between the present position information of the motor, which is obtained by the position detecting portion, and a target value of position control becomes zero, comprising:

a proportional calculation portion for calculating said error;

an integration calculation portion for integrating the errors calculated by said proportional calculation portion;

a differential calculation portion for calculating a first-order derivative per time with respect to the position information from said position detecting portion;

a PID calculation processing portion for calculating an amount of control by adding respective outputs of said proportional calculation portion, said integration calculation portion, and said differential calculation portion, after said respective outputs have been multiplied by respective weighting coefficients; and a pulse width modulating control portion for generating a control signal having a duty cycle that is varied in response to the amount of control from said PID calculation processing portion, and for carrying out drive control of the direct current motor on the basis of said control signal.

2. The motor-controlling circuit for an optical-axis-adjusting unit of a vehicle illuminating device according to claim 1, further comprising:

a dead band setting portion, which establishes a dead band centered around the point where the error value is zero; and a comparing portion which compares said error to said dead band, wherein when said comparing portion judges that the error value obtained by said proportional calculation portion is in the scope of the dead band, the PID calculation processing portion regulates the amount of control to be zero.

3. The motor-controlling circuit for an optical-axis-adjusting unit of a vehicle illuminating device according to claim 1, wherein said differential calculation portion calculates a velocity as the first-order derivative amount per time on the basis of the present position of motor, the past position of one time unit before the present position, and the past position of two time units before the present position.

4. The motor-controlling circuit for an optical-axis-adjusting unit of a vehicle illuminating device according to claim 1, wherein said differential calculation portion calculates a square-law value after having performed a first-order derivative calculation per time, and sends the square-law value to said PID calculation processing portion.

5. The motor-controlling circuit for an optical-axis-adjusting unit of a vehicle illuminating device according to claim 1, further comprising:

a judgment-of-status portion, which always monitors change with respect to the target value and present value for position control, and which is connected to said integration calculation portion; and an integration condition determining portion connected to said judgment-of-status portion and to said integration calculation portion, wherein if any change occurs in both the target value and the present value, the integration calculation portion regulates the amount of error, to be added as an amount of integration, to be zero.

6. The motor-controlling circuit for an optical-axis-adjusting unit of a vehicle illuminating device according to claim 1, further comprising:

a judgment-of-status portion which always monitors change with respect to the target value and present value for position control, and which is connected to said integration calculating portion, wherein the judgment-of-status portion regulates an operating frequency of integration in said integration calculating portion so as to be lower in the case where a change in only the present value is recognized than that in the case where a change in only the target value is recognized.

7. The motor-controlling circuit for an optical-axis-adjusting unit of a vehicle illuminating device according to claim 1, further comprising:

a judgment-of-status portion which always monitors change with respect to the target value and present value for position control; and a PWM frequency determination portion connected to said judgment-of-status portion and to said pulse width modulating control portion, wherein when a change in the target value and the present value decreases, or no change is recognized in either the target value or the present value, the frequency of the control signal that is outputted by the pulse width modulation portion is controlled by the PWM frequency determination portion so as to be gradually made lower in line with elapse of time.

* * * * *